United States Patent [19]

Barbará et al.

[11] Patent Number: 5,710,916
[45] Date of Patent: Jan. 20, 1998

[54] METHOD AND APPARATUS FOR SIMILARITY MATCHING OF HANDWRITTEN DATA OBJECTS

[75] Inventors: Daniel Barbará, Princeton; Ibrahim Kamel, Monmouth Junction, both of N.J.

[73] Assignee: Panasonic Technologies, Inc., Princeton, N.J.

[21] Appl. No.: 491,506

[22] Filed: Jun. 16, 1995

Related U.S. Application Data

[63] Continuation-in-part of Ser. No. 324,231, Oct. 17, 1994, Pat. No. 5,524,240, which is a continuation-in-part of Ser. No. 248,392, May 24, 1994, abandoned.

[51] Int. Cl.$^6$ .................................................. G06F 17/30
[52] U.S. Cl. .................. 395/609; 395/603; 395/605; 395/606; 345/575; 345/600; 345/700
[58] Field of Search .............................. 395/600, 603, 395/605, 606, 609; 382/13; 345/575, 600, 700

[56] References Cited

U.S. PATENT DOCUMENTS

| | | |
|---|---|---|
| 3,588,823 | 6/1971 | Chow et al. . |
| 4,028,673 | 6/1977 | Taylor et al. .................. 340/146.3 |
| 4,284,975 | 8/1981 | Odaka ............................ 340/146.3 |
| 4,317,109 | 2/1982 | Odaka et al. .................. 340/146.3 |
| 4,419,740 | 12/1983 | Hevenor, Jr. . |
| 4,553,206 | 11/1985 | Smutek et al. . |
| 4,601,012 | 7/1986 | Aiken, Jr. . |
| 4,653,107 | 3/1987 | Shojima et al. .................... 382/13 |
| 4,718,102 | 1/1988 | Crane et al. ...................... 382/13 |
| 4,975,975 | 12/1990 | Filipski . |
| 4,989,258 | 1/1991 | Takahashi et al. . |
| 5,014,327 | 5/1991 | Potter et al. . |
| 5,033,087 | 7/1991 | Bahl et al. . |
| 5,065,431 | 11/1991 | Rollett . |
| 5,123,057 | 6/1992 | Verly et al. . |

(List continued on next page.)

OTHER PUBLICATIONS

Walid G Aref "The Handwritten-Trie: An Indexing Method for Handwritten Databases" MITL, pp. 1–20, Apr. 1994.

Muhlbauer et al., "Script-A Prototype for therecognition of continuous, cursive handwritten input by means of neural network simulator." IEEE, pp. 1972–1677, 1993.

Dimitriadis et al., "On-line hanwritten symbol recognition, using an art based neural network hierarchy.", IEEE, pp. 944–949, 1993.

(List continued on next page.)

Primary Examiner—Thomas G. Black
Assistant Examiner—Jean M. Corrielus
Attorney, Agent, or Firm—Ratner & Prestia

[57] ABSTRACT

Apparatus for determining a distance between two handwritten strings in a database. A processor extracts global features from each string. The processor divides the string into strokes, and identifies a plurality of bounding boxes. Each box contains a different stroke. The processor extracts global features from the suing, including: (1) a number of points; (2) a maximum angle between a first point in the string and a corner of the tallest bounding box; (3) a number of positive inversions; and (4) a number of negative inversions. The apparatus calculates the distance between the strings based on all of the numbers of points, maximum angles, numbers of positive inversions and numbers of negative inversions. A fixed query tree index may be formed. The tree has leaves and internal nodes belonging to multiple levels. A different key is associated with each level. Each key is a handwritten string. Each string is associated with one of the leaves, such that each child of each internal node in any of the levels between the one leaf and the root node is a root of a respective subtree. Each string associated with any leaf in the subtree which includes the one leaf is equally distant from the key associated with the one level, based on the global features. The tree is queried to search for a subset of the strings, such that each string in the subset is within a threshold distance of an input string, according to the distance function.

30 Claims, 21 Drawing Sheets

U.S. PATENT DOCUMENTS

| | | | |
|---|---|---|---|
| 5,129,002 | 7/1992 | Tsuboka | 381/43 |
| 5,136,687 | 8/1992 | Edelman et al. | |
| 5,151,950 | 9/1992 | Hullender | 382/13 |
| 5,164,996 | 11/1992 | Pastor | 382/25 |
| 5,194,852 | 3/1993 | More et al. | 340/712 |
| 5,202,986 | 4/1993 | Nickel | |
| 5,226,091 | 7/1993 | Howell et al. | 382/13 |
| 5,241,619 | 8/1993 | Schwartz et al. | |
| 5,267,327 | 11/1993 | Hirayama | 382/13 |
| 5,285,505 | 2/1994 | Kim et al. | 382/13 |
| 5,303,367 | 4/1994 | Leenstra, Sr. et al. | |
| 5,312,833 | 5/1994 | Chang et al. | 395/600 |
| 5,321,833 | 6/1994 | Chang et al. | |
| 5,379,422 | 1/1995 | Antoshenkov | |
| 5,410,611 | 4/1995 | Huttenlocher et al. | 382/9 |
| 5,459,739 | 10/1995 | Handley et al. | 371/36 |
| 5,481,625 | 1/1996 | Suzuki | 382/187 |
| 5,550,931 | 8/1996 | Bellegarda et al. | 382/187 |

OTHER PUBLICATIONS

Paruzeau et al., "A comparative analysis of regional correlation, Dynamic time Warping and skeletal tree matching for signature verification." IEEE, vol. 12, No. 7, pp. 710–717, Jul. 1990.

Emami et al. "on–line recognition of handwritten arabic characters.", IEEE, vol. 12, No. 7, pp. 704–710, Jul. 1990.

Kundu et al., "Handwritten word recognition using HMM with adaptive length viterbi algorithm.", IEEE, vol. 3, pp. 153–156, 1992.

Vrbsky et al. "Query processor that produces monotonically improving approximate answers" IEEE vol. 5, No. 6, pp. 1056–1068, Dec. 1993.

Tarpet et al. "The state of the art in on–line Handwrittiong recognition" IEEE, vol. 12 No. 8, pp. 787–808, Aug. 1990.

Samir et al. "on–line recognition of handwritten arabic characters" IEEE, vol. 12, No. 7, pp. 704–710, Jul. 1990.

Lopresti, D.P. & Tomkins, A., Approximate Matching of Hand–Drawn Pictograms, IWFHR III, Buffalo, NY, May 25–27, 1993 (pp. 102–111).

Lopresti, D.P. & Tomkins, A., Pictographic Naming, Interchi '93 Adjunct Proceedings, (pp. 77–78).

Harriehausen–Muhlbauer et al., "Script—A Prototype for therecognition of continuous cursive, handwritten input by means of neural network simulator", IEEE, 1993, pp. 1672–1677.

Dimitriadis et al., "On–line handwritten symbol recognition using an Art based neural network hierachy", IEEE, 1993, pp. 944–949.

Aref, W.G., Vallabhaneni, P. & Barbara, D., Towards a Realization of Handwritten Databases: I Training and Recognition, MITL–TR–98–94, Matsushita Information Tech. Lab., Apr. 4, 1994 (pp. 1–18).

Aref, W.G., The Handwritten Trie: An Indexing Method for Handwritten Databases, MITL–TR–107–94, Matsushita Information Tech. Lab., Apr. 29, 1994 (pp. 1–20).

Lopresti, D.P.& Tomkins A., Pictographic Naming, MITL–TR–21–92, Matsushita Information Tech. Lab., Aug. 28, 1992 (pp. 1–18).

Lopresti, D.P. & Tomkins, A., Applications of Hidden Markov Models to Pen–Based Computing, MITL–TR–32–92, Matsushita Information Tech. Lab., Nov. 9, 1992 (pp. 1–16).

Korth, H.F. & Silberschatz, A., Database Concepts, McGraw–Hill, Inc., 1991, 2nd Ed., Chapter 4.2 (pp. 121–134).

Chen, M., Kundu, A., & Zhou, J., Off–Line Handwritten Word Recognition (HWR) Using a Single Contextual Hidden Markov Model. IEEE, 1992 (pp. 669–672).

Kundu, A. & Bahl, P., Recognition of Handwritten Script: A Hidden Markov Model Based Approach, M4.20, IEEE 1988, (pp. 928–931).

Vlontzos, J.A. & Kung, S.Y., A Hierarchical System for Character Recognition, ISCAS, IEEE, 1989 (pp. 1–4).

Yamato, J., Ohya, J. & Ishii, K., Rcognizing Human Action in Time–Sequential Images using Hidden Markov Model, IEEE, 1992 (pp. 379–385).

Vrbsky S.V. & Liu, J.W.S., Approximate—A Query Processor That Produces Monotonically Improving Approximate Answers, IEEE Transactions on Knowledge & Data Engineering, vol. 5, No. 6, Dec. 1993 (pp. 1056–1068).

ZLoof, M.M., Query–by–Example: a data base language, IBM Syst. J. No. 4, 1977 (pp. 324–343).

Bose, C.B. & Kuo, S., Connected and Degraded Text Recognition Using Hidden Markov Model, IEEE 1992 (pp. 116–119).

Tappert, C.C., Suen, C.Y. & Wakahara, T., The State of the Art in On–Line Handwriting Recognition, IEEE Transactions on Pattern Analysis & Machine Intelligence, vol. 12, No. 8, Aug. 1990 (pp. 787–808).

Barbara, D., Garcia–Molina, H. & Porter, D., The Management of Probabilistic Data, IEEE Transactions on Knowledge & Data Engineering, vol. 4, No. 5, Oct. 1992 (pp. 487–502).

Stonebraker, M., Jhingran, A., Goh, J. & Potamianos, S., On Rules, Procedures, Caching and Views in Data Base Systems, ACM 1990 (pp. 281–290).

Barbara, D. & Alonso, R., Processing Continuous Queries in General Environments, Matsushita Information Tech. Lab., Jun. 4, 1993 (pp. 1–30).

Lopresti, D. & Tomkins A., A New Paradigm for Pen Computing, MITL–TR 71–93, Matsushita Information Tech. Lab., Oct. 14, 1993 (pp. 1–16).

Paruzeau et al., "A comparative analysis of regional correlation, Dynamic time Warping, and skeletal tree matching for signature verification", IEEE, Jul. 1990, vol. 12., No. 7, pp. 710–717.

Al–Emami et al., "On–line Recognition of Handwritten Arabic characters", IEEE Jul. 1990, vol. 12, No. 7, pp. 704–710.

METHOD AND APPARATUS FOR SIMILARITY MATCHING OF HANDWRITTEN DATA OBJECTS

This application is a Continuation-in-Part of U.S. application Ser. No. 08/324,231 filed Oct. 17 1994 now U.S. Pat. No. 5,524,240, which is a Continuation-in-Part of U.S application Ser. No. 08/248,392 filed May 24, 1994 which is now abandoned.

FIELD OF THE INVENTION

The present invention is directed to the field of matching similar handwritten objects to one another.

BACKGROUND OF THE INVENTION

In recent years a number of pen based processor systems have been released or announced (such as the Apple Newton™). These devices range from personal digital assistants (PDAs)—intended to keep personal data such as schedules, notes, address books, etc.—to full-scale computers with pens instead of (or in addition to) keyboards. The pen-based systems are equipped with large pen-based tablets, or small writable screens, and provide the ability to take notes and browse and mark-up electronic documents. This allows the user to store data in the form of handwritten notes and formulate queries based on handwritten examples. Given the size limitations imposed by portability requirements, pens are the most natural (and some times the only) way to input data into PDAs.

As with any other type of computer, PDA users need to search for data that were previously entered. When the data have been handwritten, the problem becomes more difficult than in conventional situations. The conventional way of addressing this problem is by using handwriting recognition, i.e., a procedure for converting pen strokes into strings of ASCII characters (or any other fixed character set). Once converted into a fixed character set, strings may be manipulated and indexed in conventional ways. Similarly, the search algorithm translates the query string into a sequence of ASCII characters and then performs a traditional search through the database. Thus, the recognition phase is an intermediate step between the input device (pen and tablet) and the storage device.

There are two significant problems with handwriting recognition: (1) it is extremely slow; and (2) it is prone to errors, particularly if cursive writing is used. Cursive writing poses greater pattern recognition problems, because it is difficult even to identify letter boundaries in the cursive string. Moreover, even if handwriting recognition became highly accurate, it still provides a mapping from a highly expressive medium such as ink to a constrained character set, such as ASCII strings. A system that recognizes ASCII does not necessarily recognize Kanji, Greek, Cyrillic, Arabic or Hebrew characters, or arbitrary handwritten pictograms.

Searching handwritten cursive text is also challenging because two people can not write a word exactly the same way. Moreover, a person can not even recreate perfectly his own previously drawn word. Hence, an exact-match query is not appropriate and similarity (or approximate string matching) is more suitable in this case. The search algorithm should look for all strings which are "similar"0 to the query string.

Approximate ink matching (AIM) is an alternative to handwriting recognition. AIM is a technique that evaluates how well two pictograms match. The procedure simply focuses in finding a pictogram that resembles the input, without trying to "understand"0 or translate its meaning. AIM algorithms with high matching accuracy have been developed, generally involving sequential pairwise comparisons between an input string and each respective string in the entire pictogram repository. The problem with the AIM technique is that it is computationally expensive. As the size of the pictogram repository grows, this process becomes painfully slow and impractical.

SUMMARY OF THE INVENTION

The present invention is embodied in apparatus for determining a distance between two of a plurality of handwritten strings in a database.

The apparatus includes a processor for extracting a plurality of global features from each one of the plurality of handwritten strings in the database. The processor divides the handwritten string into a plurality of strokes, and identifies a plurality of bounding boxes. Each bounding box contains a respectively different one of the plurality of strokes. The processor extracts features from the string. The features include: (1) a number of points in the string; (2) a maximum angle between a first one of the points in the string and a corner of a tallest one of the plurality of bounding boxes; (3) a number of positive inversions in the string; and (4) a number of negative inversions in the string.

The apparatus includes a storage medium for storing the extracted global features. The apparatus calculates the distance between the two handwritten strings based on all of the numbers of points, maximum angles, numbers of positive inversions and numbers of negative inversions extracted by the extracting means.

According to another aspect of the invention, a fixed query tree index is formed. The fixed query tree has a plurality of leaves and a plurality of internal nodes which belong to a plurality of levels. A respectively different key is associated with each one of the plurality of levels. Each key is a handwritten string. Each string is associated with one of the plurality of leaves, such that each child of each internal node in any one of the plurality of levels between the one leaf and the root node of the index is a root of a respective subtree. Each string associated with any leaf in the subtree which includes the one leaf is equally distant from the key associated with the one level, using a distance function based on the global features. The fixed query tree is queried to search for a first subset of the strings, such that each string in the first subset is within a threshold distance of an input string, according to the distance function.

According to still another aspect of the invention, an R-tree index is formed having a plurality of leaves and a plurality of internal nodes. Each one of the plurality of internal nodes has at least one child node.

For each respective one of the child nodes, a pointer to the child node and an identification of a minimum bounding contour associated with the child node are provided. The minimum bounding contour contains a plurality of further minimum bounding contours pointed to by respective ones of a corresponding plurality of entries in the child node, if the child node is an internal node.

A plurality of entries are stored in each leaf node. Each entry comprises an additional minimum bounding contour which is associated with a respective range of values for each one of the plurality of features. The additional minimum bounding contour is associated with a plurality of pointers. Each pointer points to a respective one of the plurality of electronic handwritten strings for which the features of at least one stroke thereof are within the respective range of values of the additional minimum bounding contour. All the additional minimum bounding contours stored in any one leaf node differ from one another by less than a threshold distance.

OVERVIEW

The invention is a method and apparatus for performing similarity matching of handwritten objects, and for indexing a plurality of handwritten objects in a database. Each string is represented by a handwritten object; the objects may be indexed in a balanced R-tree or a fixed query tree, both of which are described in detail below. Preferably, the invention is used in a personal digital assistant, or other microcomputer having a pen-based interface for entering handwritten data objects.

Figure 1:
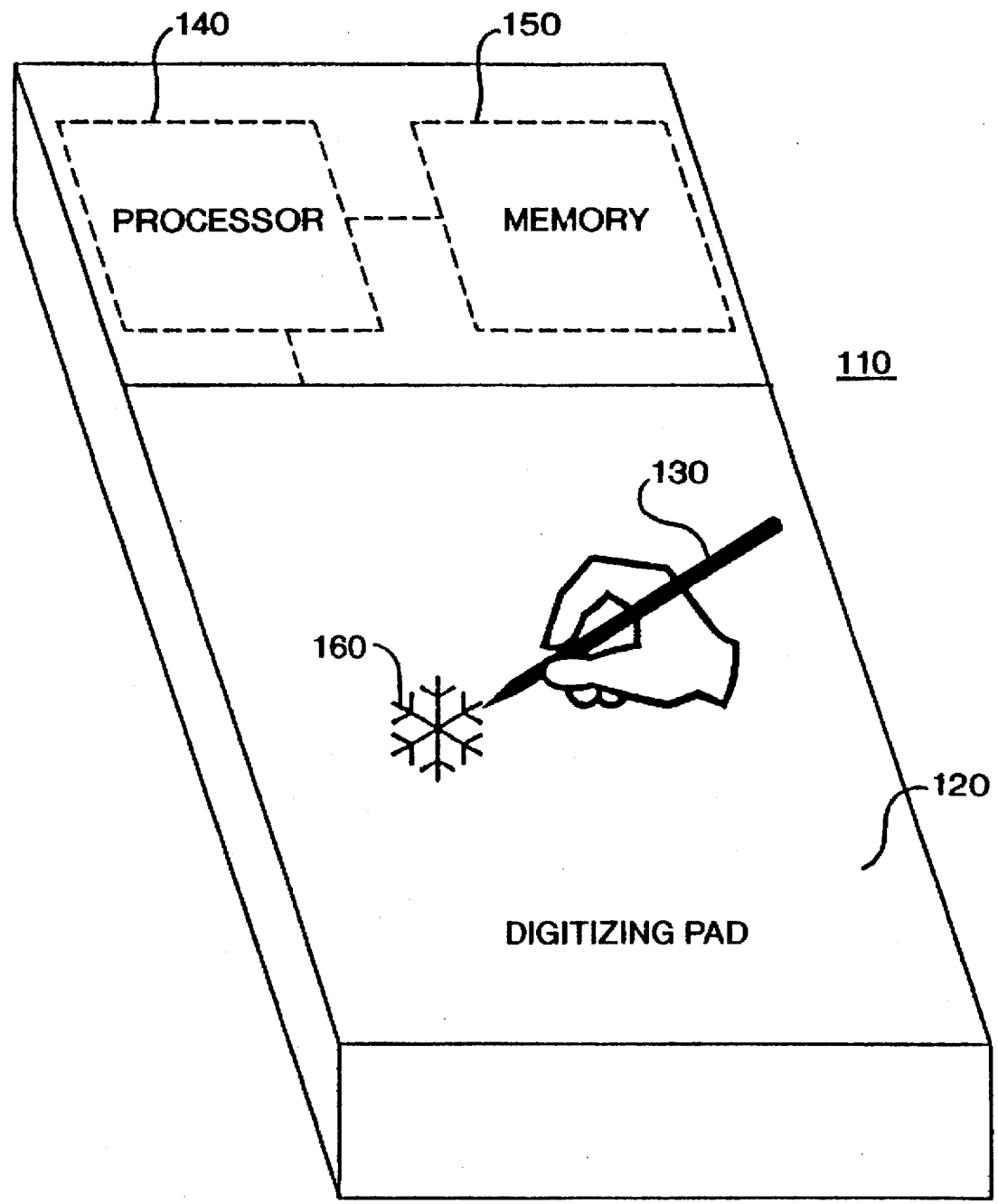
FIG. 1 is a block diagram of an exemplary apparatus according to the invention.

FIG. 1 is a diagram showing an exemplary personal digital assistant (PDA) 110 in which the invention may be used. The PDA 110 has a digitizing pad 120. The digitizing pad 120 detects movement of a stylus 130 and provides signals representing X-Y coordinates of the stylus 130 to a processor 140. The processor 140 a performs a feature extraction process to determine the symbols represented by the movement of the stylus. Each string is divided into a plurality of strokes or symbols, which are feature vectors.

Once features are extracted from the string, a plurality of global features may be determined for the string. Global features are selected so as to distinguish one string from another without a pairwise comparison of the individual strokes in each string. The inventors have discovered a set of four global features that are especially suitable for this purpose, including: (1) the number of points in the string; (2) the maximum angle between a first one of the points in the string and a corner of the tallest bounding box of the string (where a bounding box is the smallest rectangle that completely encloses one of the strokes in the string); (3) the number of positive inversions in the string; and (4) the number of negative inversions in the string.

According to the invention, the raw stroke data and/or the global features of the string are indexed and stored in memory 150, which may be random access memory, the disk drive of the PDA 140, or other storage medium. It is not necessary to perform any pattern recognition operation that would determine the meaning of the string during the indexing process.

Subsequently, during a query or retrieval operation, the user enters an input data sequence using stylus 130 and digitizing pad 120. A similarity matching operation is performed to determine which strings are closest to the input data sequence on the basis of the raw stroke information, or the global features. Techniques which include comparison of the individual strokes are generally more accurate, but slower than techniques based on global features. However, neither type of similarity matching operation requires any pattern recognition operation to determine the meaning of either the input data sequence or the stored strokes or global features of each string in the database. Because pattern recognition is slow and potentially inaccurate, elimination of pattern recognition in the invention makes retrieval of a solution set in response to the query very fast. The objects found by the query may be displayed in a browser, from which the user selects the document to be retrieved.

Figure 2:
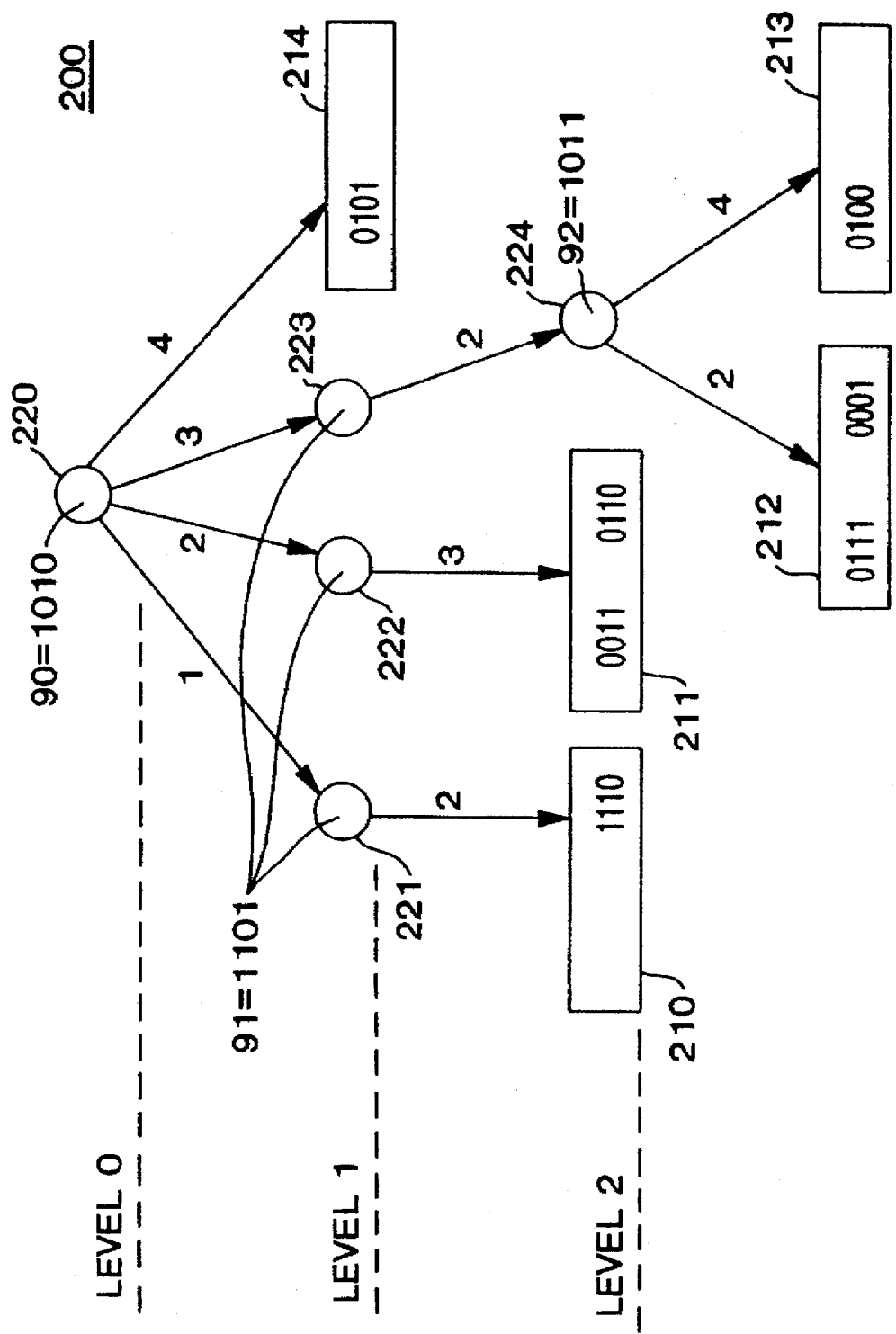
FIG. 2 is a diagram of an exemplary Fixed Query Tree index according to the invention.

According to one aspect of the invention, the strings are indexed in a fixed query (FQ) tree such as tree 200 shown in FIG. 2. Tree 200 is a fixed query tree index having a plurality of leaves 210–214 and a plurality of internal nodes 220–224 which belong to a plurality of levels. A respectively different key $q_0$, $q_1$, $q_2$, is associated with each one of the plurality of levels 0, 1, and 2 respectively. Each key $q_0$, $q_1$, $q_2$ is a handwritten string, with respective values "1010,"0 "1101,"0 and "1011". Each string in the database is associated with a respective one of the leaves 210–214. Each internal node 220–224 in any of the levels has a respective child which is the root of a respective subtree; each string associated with any leaf in the subtree is equally distant from the key associated with the level of the parent of the root of the subtree. The distances of the strings from the input sequence are determined using a distance function which may be based on global features.

Figure 7:
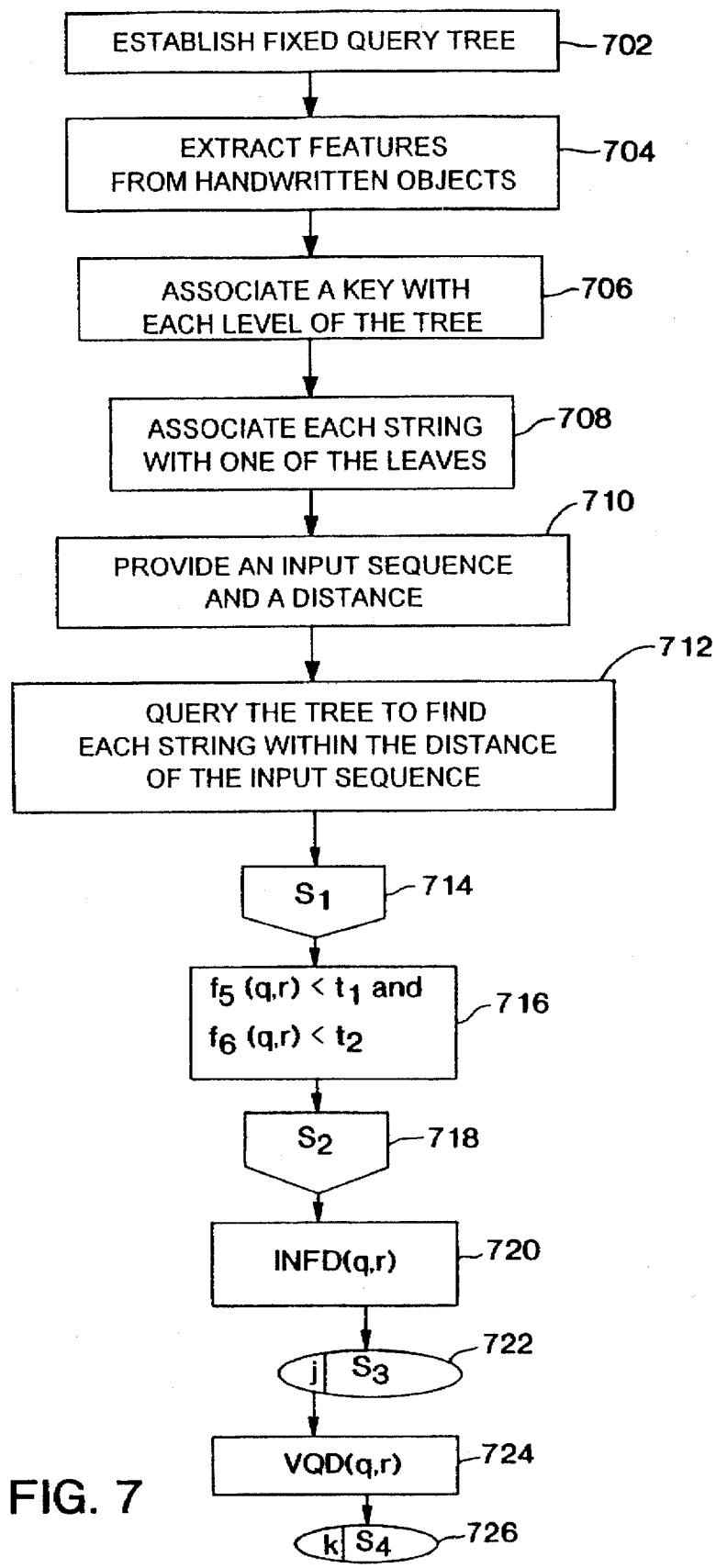
FIG. 7 is a flow chart diagram showing an exemplary method of tandem matching using multiple stage query processing.

FIG. 7 is a flow chart diagram of an exemplary method of indexing and querying the handwritten object database, using a fixed query tree. At step 702, the tree is established. At steps 704–708, features are extracted from the handwritten objects and indexing is performed. At step 706, a key is associated with each level of the tree. In the exemplary embodiment, the keys are random strings. At step 708, as each handwritten string is added to the database, it is associated with one of the leaves of the tree.

For example, node 220 has a key $q_0$ which is the string "1010."0 Node 223 is one of the children of node 220, and is the root of a subtree which includes leaves 212 and 213. All of the leaves 212 and 213 of the subtree which has node 223 as a root store strings that are equally distant from the key $q_0$, based on a distance function described in detail below. In this case, strings "0111,"0 "0001"0 and "0100"0 have a distance of three from "1010."0 Similarly, leaves 212 and 213 are the leaves of a subtree having node 224 as its root. Therefore, the strings in nodes 212 and 213 are equally distant from the query $q_1$, which is the query associated with the parent of node 224. All three strings have a distance of 2 from the string "1101"0 in $q_1$.

Referring again to FIG. 7, at step 710, once the strings are indexed, the fixed query tree may be queried to search for a first subset of the strings, such that each string in the first subset is within a threshold distance of an input string. At step 712, the input string and the threshold distance are provided, and the tree is queried. At step 714, a solution set is provided.

Optionally, the solution set from the query may be further processed in steps 716–726, using an edit distance computation and/or additional global feature comparison. These additional operations reduce the size of the final solution set presented to the user and reduce the number of incorrect strings in the proposed solution set.

In an exemplary method referred to hereafter as "tandem matching,"0 the further processing is performed in three stages: a global feature matching operation in step 716 (which produces a second subset of the strings at step 718) and two edit distance type operations in steps 720 and 724 (which produce third and fourth subsets of the strings in steps 722 and 726, respectively. The first edit distance computation in step 720 only considers insertion and/or deletion operations. The second edit distance computation in step 724 also considers substitution of one symbol for another and splitting or merging of symbols. Each successive stage 716, 720 or 724 reduces the solution set that is used as an input to the next stage. Although tandem matching in steps 716–726 is computationally intensive, the inventors have determined that tandem matching is efficient when applied to the solution set of a query which uses the exemplary fixed query tree 200.

Figure 8:
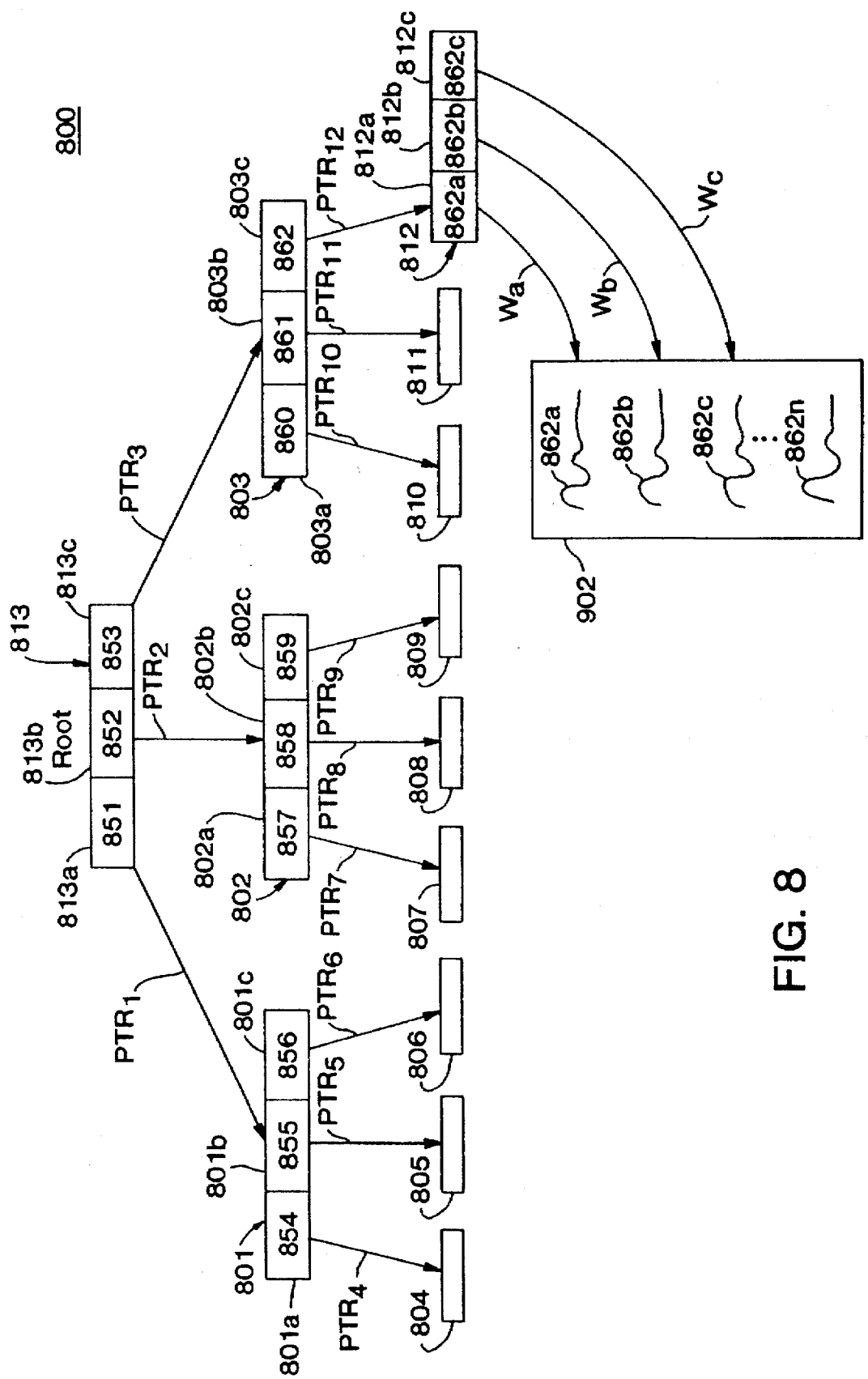
FIG. 8 is an block diagram of an exemplary R-tree index according to the invention.

According to another aspect of the invention, the plurality of strings in the database may be indexed in an R-tree index 800, as shown in FIG. 8. The R-tree 800 is an extension of the B-tree for multi-dimensional objects. Objects that are very similar are stored or pointed to in the same leaf node of the R-tree 800. For objects that are stored in respectively different leaf nodes, the more remote the nearest common ancestor node, the more different the objects are likely to be. That is, strokes or strings stored in leaf nodes having a common parent are likely to be more similar to each other than strokes or strings stored in leaf nodes only having a common grandparent.

Figure 9:
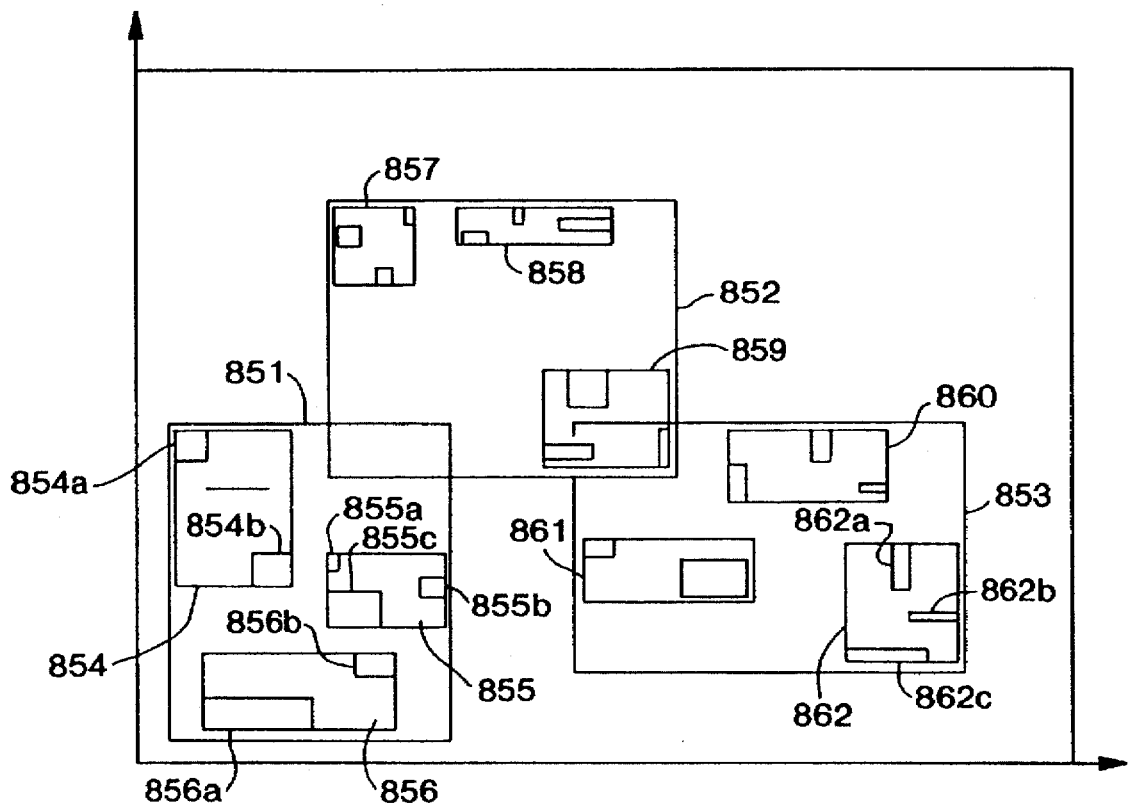
FIG. 9 is a diagram showing a plurality of minimum bounding rectangles in the R-tree shown in FIG. 8.

An object in R-tree 800 (e.g., a stroke or string) is represented by a minimum bounding contour (MBC) in a multi-dimensional feature space. Exemplary MBCs 854a–854b, 855a–855c 856a–856b, and 862a–862c are shown in FIG. 9. In a two dimensional feature space, as shown in FIG. 9, the MBCs may be rectangles. For example, minimum bounding contours 854a and 854b represent objects (not shown) contained within the respective regions of MBCs 854a and 854b. In an m dimensional feature space, the MBC's may be hyper-rectangles having m pairs of limits. Each pair of limits includes a minimum value and a maximum value for a respective one of the m features.

The R-tree 800 (FIG. 8) defines a hierarchical set of MBCs shown in FIG. 9. Each internal node 813, 801, 802 and 803 (FIG. 8) has a plurality of entries. For example, node 801 has entries 801a–801c. Each entry in a given internal node corresponds to a respectively different range of a function which is based on at least one feature of a stroke or a string. Each entry in an internal parent node 813, 801–803 has a pointer (PTR) to a child node and an identification, R, of a minimum bounding contour associated with the child node. The minimum bounding contour (FIG. 9) identified in the parent node (FIG. 8) contains a plurality of further minimum bounding contours (FIG. 9). The further MBCs (FIG. 9) are pointed to by entries in the child node (FIG. 8). For example, in FIG. 8, entry 813a in parent node 813 has a pointer to child node 801 and an identification of MBC 851, which is associated with child node 801. The minimum bounding contour 851 identified in the parent node 813 contains a plurality of further minimum bounding contours 854, 855, and 856. The further MBCs 854–856 are pointed to by the respective entries 801a–801c in child node 801. For simplicity, each pointer $PTR_1$–$PTR_{12}$ is indicated by a respective arrow in FIG. 8.

Leaf nodes 804–812 contain entries (e.g., 812a–812c in leaf node 812) of the form (OBJ-ID, R), where OBJ-ID is a pointer to the object description, and R is the MBC of the object. In FIG. 8, the objects 862a–862n are strings in a database 902. The leaf nodes 804–812 have entries of the form (P, WORD-ID), where P contains the coordinates (in the multi-dimensional feature space) of a symbol or stroke, and WORD-ID contains a pointer to the word that contains this stroke. In FIG. 8, each pointer WORD-ID is indicated by an arrow $W_a$, $W_b$, and $W_c$; the "R"0 value of the MBC is designated by the numbers 862a–862c in entries 812a–812c, respectively.

Figure 10:
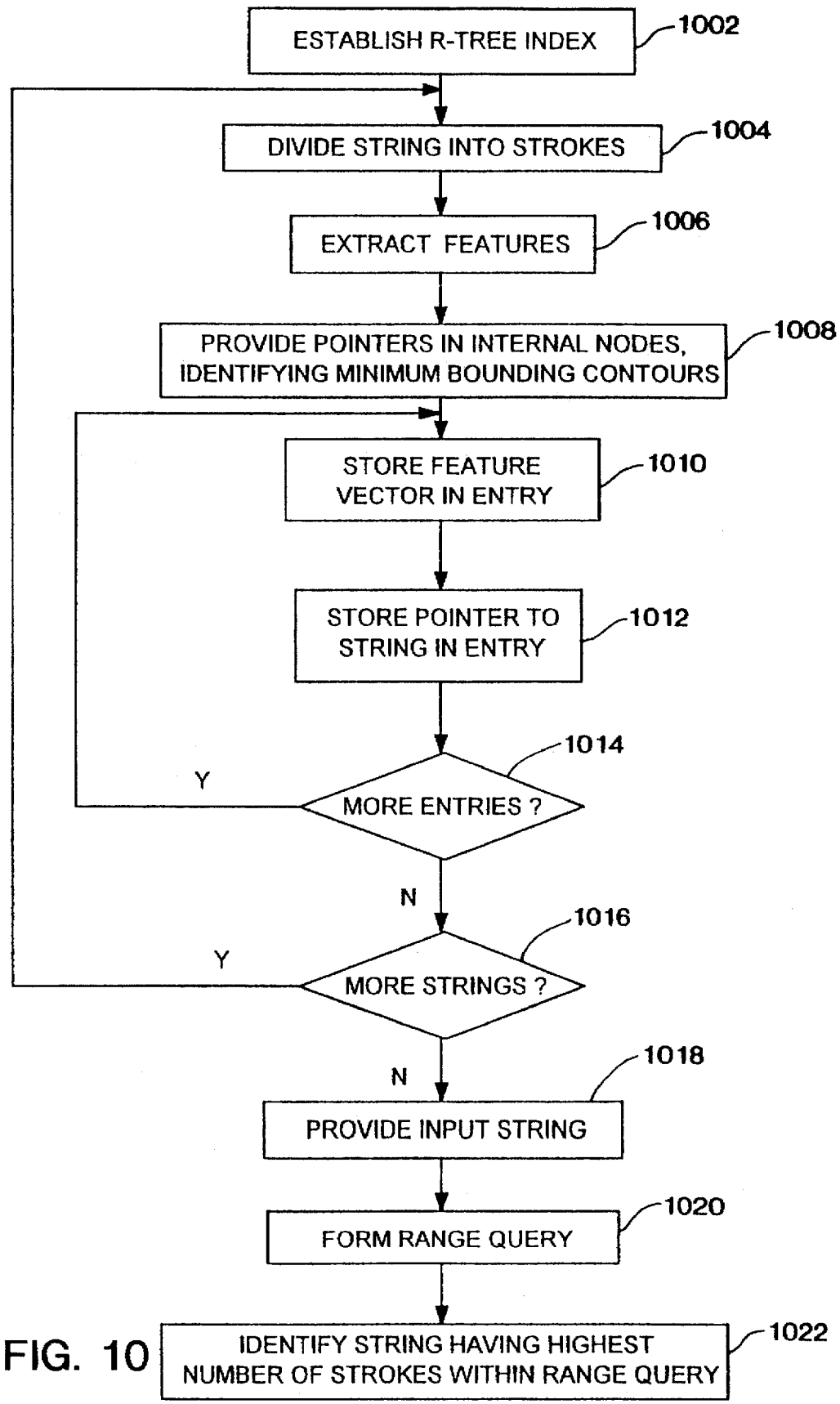
FIG. 10 is a flow chart diagram of a method for inserting strings in the R-tree diagram shown in FIG. 8.

FIG. 10 is a flow chart diagram of an exemplary method for indexing and searching the strings in an R-tree index. At step 1002, the R-tree is established. At steps 1004–1016, strings are added to the database and indexed. At step 1004, each string is divided into strokes. At step 1006, features are extracted. The features may be feature vectors for each individual stroke (or symbol). At step 1008, a path from the root node 813 to one of the leaves is established by providing pointers in a subset of the internal nodes. At each level, the pointer points to a successively smaller MBC that contains the stroke. At step 1010, a feature vector representing one of the strokes in the string is stored in an entry of a respective leaf of the R-tree. At step 1012, a pointer WORD-ID to the string containing the stroke is stored in the entry. At steps 1014, steps 1010 and 1012 are repeated for each stroke (entry) of the string. Each entry associated with a specific string is stored in a respectively different leaf. At step 1016, steps 1010–1014 are repeated for each string that is inserted in the database.

At step 1018, once the handwritten strings are indexed in index 800, the index may be queried. An input string which comprises a plurality of input strokes in provided. At step 1020, a plurality of range queries are defined by a respective plurality of contours. Each range query defines a range of values which contains a respective one of the input strokes. In the exemplary embodiment, each range is centered about its corresponding input stroke. Several of the strings may have one or more strokes for which the feature vector representing the stroke falls within one of the plurality of contours of the range queries. At step 1022, a simple voting algorithm is applied. The string that has the most strokes for which the respective feature vectors fall within the contours of any of the range queries is identified. Each string has a score which indicates the number of times it appears as an answer for any of the range queries. The set of words having the highest scores are reported as the answer.

Thus, the similarity query comprises a plurality of range queries; one for each stroke in the query string. Each range query produces a set of word-ids (word identifications) which contain a stroke similar to the query stroke. Using a simple voting algorithm, the few strings closest to the query are reported. The index 800 may handle different types of errors that might result from stroke segmentation, namely, insertion, deletion, and substitution. It can also handle substring matching efficiently.

These and other aspects of the invention are described in greater detail below with reference to the exemplary embodiments.

DETAILED DESCRIPTION

FEATURES AND DISTANCE METRICS FOR SIMILARITY MATCHING

One aspect of the present invention is a method and apparatus for subdividing the pictograms in strokes, characterizing the strokes by vectors of features and indexing them. According to this method, similarity matching is achieved either by extracting individual strokes in an input string, or by extracting global feature data from the string. The stroke data or the global feature data may be compared with data of the same type extracted from each of a plurality of known strings in a database. A distance metric is defined between the input string and the known strings. The known strings that have the smallest distance between them (according to the metric) are identified as most closely matching the input string. It is not necessary to perform any pattern recognition operation to determine what the input string represents, or what any of the known strings in the database represent.

Electronic ink is a sequence of time-stamped points in the plane as defined by Equation (1):

$$S=(x_1, y_1, t_1), (x_2, y_2, t_2), \ldots, (x_k, y_k, t_k) \quad (1)$$

Given a sequence I and a database of sequences $S_j$ (j=0, ..., l), the invention searches the database for the sequences that are similar to I.

There are many ways of representing ink. In the first exemplary embodiment, ink is treated as a sequence of strokes. As defined herein, a stroke is a sequence of contiguous points in the plane. Two operations must be performed before any strings may be indexed: stroke segmentation and feature extraction.

Figure 15A:
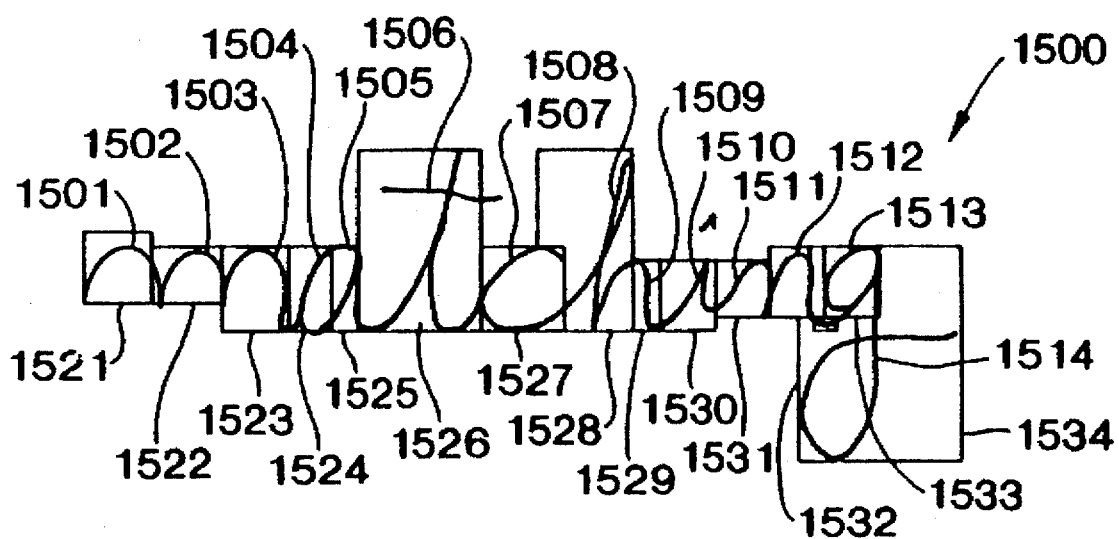
FIGS. 15A and 15B show how a string is divided into strokes, and a minimum bounding rectangle is formed for each stroke.

In stroke segmentation, the sequence of points is divided into strokes. This may be accomplished in many different ways. The exemplary method considers that a new stroke is initiated when a local minimum of the y coordinate is encountered. FIG. 15A shows an example of segmentation using this method to segment the word, "matching" 1500. Each set of points connecting two successive y minima form a respectively different stroke 1501–1513. A respective bounding box 1521–1533 is established for each stroke 1501–1513. The bounding box for a given stroke has the more negative of the two successive y minima as its lower y coordinate. The maximum y coordinate of the bounding box is the maximum y value between the two successive y minima. The minimum and maximum x coordinates of the bounding box are the x values of the two successive y minima for that stroke. A bounding box is also referred to herein as the Minimum Bounding Rectangle (MBR) of a stroke.

After performing stroke segmentation, the sequence has the following representation defined by Equation (2):

$$S=S_1, S_2, \ldots, S_n \quad (2)$$

where:

$$S_i=(x_{i1},y_{i1},t_{i1}), (x_{i2}, y_{i2},t_{i2}), \ldots, (x_{ik_i},y_{ik_i},t_{ik_i}) \quad (3)$$

The number of points in stroke i, designated by $k_i$, is determined by the location of the minima that define the stroke.

For each stroke, a set of stroke features are extracted. The exemplary set of features is set forth in Dean Rubine, *Specifying Gestures by Example,* Computer Graphics, Vol. 25, No. 4, July 1991. This feature set converts each stoke into a real-valued 13-dimensional vector. The features in the set of stroke features include:

1. the cosine of the initial angle of the stroke;
2. the sine of the initial angle of the stroke;
3. the length of the bounding box diagonal;
4. the angle of the bounding box diagonal;
5. the distance between the first and last point;
6. the cosine of the angle between the first and last point;
7. the sine of the angle between the first and last point;
8. the length of the stroke;
9. the total angle traversed;
10. the sum of the absolute value of the angle at each point;
11. the sum of squares of the angle at each point;
12. the maximum speed of the stroke squared; and
13. the duration of the stroke.

After feature extraction, a sequence has the following form:

$S=S_1,S_2, \ldots, S_n$, where $Si=\hat{v}_i=f_{i1}, f_{i2}, \ldots, f_{ik}$, and each of the $f_i$s represents a real-valued feature.

At this point, strokes are represented as multidimensional objects. Further processing is possible by using vector quantization. The k-dimensional feature space (in the example, k=13) may be transformed into a one-dimensional representation by applying vector quantization. By using this technique, a feature vector is mapped into one of m clusters. The mapping may be performed by a well-known clustering algorithm known as the k-means algorithm, which is described in J. MacQueen, "Some Methods for Classification and Analysis of Multivariate Observation,"0 *Proceedings of the Fifth Berkeley Symposium on Mathematics, Statistics and Probability,* pages 281–296, 1967.

To build the clusters, a small sample of handwriting is collected from each writer. The streams are segmented into strokes, and each stroke is converted into a vector of features, as explained above. The samples are used to calculate the average value of the i-th feature, $\mu_i$, and use these averages to compute the covariance matrix $\Sigma$, defined by Equation (4) as:

$$\Sigma_{ij} = E[(f_i - \mu_i)(f_j - \mu_j)] \qquad (4)$$

The main diagonal of $\Sigma$ contains the variances of the features. The Mahalanobis distance is used. The Mahalanobis distance is defined by Equations (5) and (6) as follows:

$$\|\hat{v}\|_M^2 = \hat{v}^T \underset{-1}{\overset{\hat{v}}{\Sigma}} \qquad (5)$$

$$d(\hat{v}, \hat{w}) = \|(\hat{v} - \hat{w})\|_M \qquad (6)$$

The mapping may be performed using the above mentioned k-means algorithm. In the exemplary method, the samples are divided into 64 groups (clusters). The feature vectors are processed sequentially, and each one is placed into a cluster. The rule for classifying new vectors uses the centroids that define each cluster. Each vector belongs to the cluster having the nearest centroid, according to the Mahalanobis distance. The final clusters may be identified as stroke types or codewords. So, finally a handwritten text may be represented as defined by Equation (7):

$$S_i = c_{i1}, c_{i2}, \ldots, c_{ik_i} \qquad (7)$$

where $c_j$ is one of the 64 clusters or codewords.

Once features are extracted and the clusters established, a variety of metrics may be used for determining a distance between any pair of strings. The clustering information may be used in establishing an R-Tree index, as described below. Three types of metrics are described herein: edit distance, global features, and inflection distance.

1. Edit Distance Metrics

The edit distance between two strings is defined as the minimum cost of transforming one string into the other. This cost is computed as the sum of the cost of the individual operations needed for the transformation. There are two considerations in choosing the edit distance: the kinds of transformations allowed and the cost of the individual operations.

The similarity between the sequence of strings of codewords may be computed by using dynamic programming. Dynamic programming methods are known by which, given two strings, P (an input pattern) and T (a known text or writing), the pattern P may be transformed into the known writing T by means of five operations:

1. Deleting a codeword.
2. Inserting a codeword.
3. Substituting a codeword by another.
4. Splitting a codeword into two.
5. Merging two codewords into one.

Each of these operations has some cost associated with it. The costs are writer-dependent. For instance, the cost of a deletion or an insertion is proportional to the size of the ink involved, or the length of the stroke type representing the ink (using the Mahalanobis distance). The cost of a substitution is the distance between the corresponding stroke types. The cost of the merge and split operations is computed by building "merge"0 and "split"0 tables that contain information of the form "an average stroke of type $\alpha$ merged with an average stroke of type $\beta$ results in a stroke of type $\gamma$. This distance metric is referred to hereinafter as "VQD."

In selecting a distance metric for a fixed query tree index, it is important that the edit distance obey the triangle inequality defined in Equation (8), i.e., $$d(P,S) \leq d(P,T) + d(T,S) \qquad (8)$$

where $d(P,S), d(P,T)$, and $d(T,S)$ are the respective distances between pairs of the three strings, P, T and S.

The VQD edit distance metric described above does not obey the triangle inequality of equation (8). As an approximation, a simpler way of evaluating distances between two strings of codewords may be used. This distance metric, known as the Levenshtein distance (abbreviated as Lev) is widely use to compare strings of different sizes. The Levenshtein distance is defined as the minimal number of symbol substitutions, insertions and deletions required to transform one string into another. An important feature of this metric is that each operation has the same cost (e.g., 1).

The Levenshtein distance does obey the triangle inequality, making it usable for the FQ-tree 200. However, this metric is less discriminating for handwritten strings than the edit distance. According to an aspect of the invention, the Levenshtein distance may be modified by multiplying it by a factor that depends on other characteristics of the strings. For instance, a series of global features may be computed for each string and a function of the difference between the values of the features of two strings may be used as a factor. This technique is described below with reference to FIGS. 17 and 18A–18D.

2. Global Features

Global features are computed using the entire sequence of points of the pictogram. A global feature is a characteristic of the entire pictogram. (As opposed to a local feature, which is a characteristic of a point or a stroke feature). In principle, one could compute the same kind of features used for strokes. However, not all of them are effective.

The inventors have determined that the global features defined below are particularly helpful in differentiating pictograms.

Figure 17:
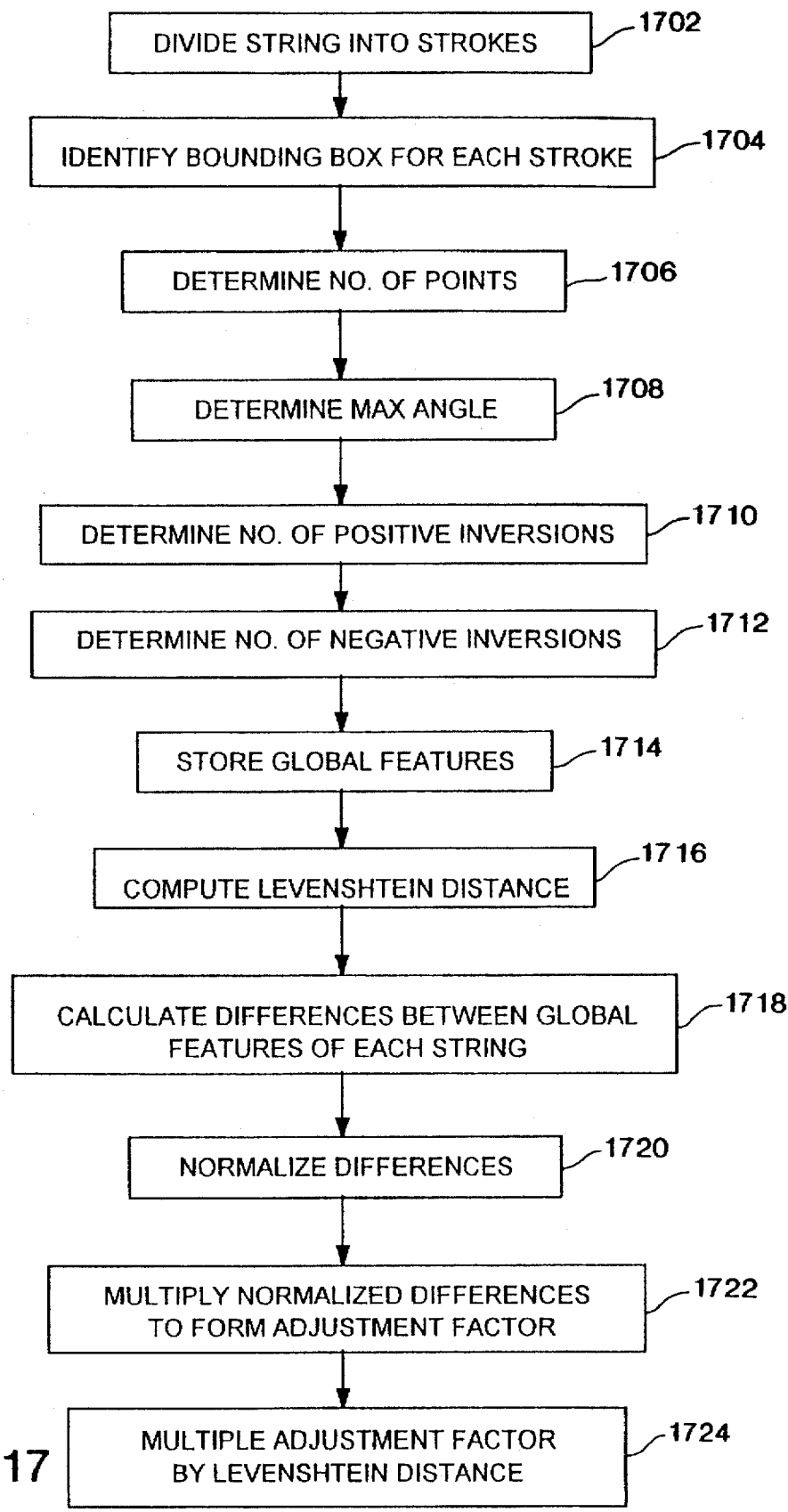
FIG. 17 is a flow chart diagram of a further exemplary method for indexing the strings in the database using the aggregate distance metric, and for querying the database.

FIG. 17 is a flow chart diagram for forming the four global features and combining them to form a distance metric. At step 1702, each string is divided into strokes. In the exemplary embodiment, each successive pair of contiguous local minima defines a stroke; the stroke includes all the points between the local minima in the pair. At step 1704, a bounding box is identified for each stroke.

At steps 1706–1712, four global values that characterize all of the strings in the database are collected. At 1706, the number of points in each string is checked, and a maximum is determined. At step 1708, the maximum characteristic angle (described with reference to FIG. 18B) for all of the strings is determined. At step 1710, the maximum and minimum numbers of positive inversions in any string are determined. At step 1712, the maximum and minimum numbers of negative inversions are determined. At step 1714, the global features collected in steps 1706, 1708, 1710 and 1712 are stored. These maximum and minimum values are updated, if necessary, each time a new string is inserted into the database.

Steps 1716–1724 are performed to determine the distance between two strings, P and Q. At step 1716, the Levenshtein distance between strings P and Q is determined. At step 1718, the four global features for measuring the distance between two strings are calculated, and at step 1720, the four normalized global features are computed. The first, $f_1$ is the normalized difference in the number of points in the two strings, as described with reference to FIG. 18A. The second, $f_2$, is the normalized difference in maximum angle between the two strings, and is described with reference to FIG. 18B. The third, $f_3$ is the normalized difference in number of positive inversions between the two strings, and is described with reference to FIG. 18C. The fourth, $f_4$, is the normalized difference in number of negative inversions between the two strings, and is described with reference to FIG. 18D.

At step 1722, the four factors $f_1$, $f_2$, $f_3$, and $f_4$ are multiplied together to form an adjustment factor. The adjustment factor $f_1$, $f_2$, $f_3$, $f_4$ is multiplied by the Levenshtein distance d between P and Q. The product of these values forms a new distance $df_1$, $f_2$, $f_3$, $f_4$, which is referred to herein as the aggregate distance. The aggregate distance is a better discriminant of pictograms. The individual global features are now described with reference to FIGS. 18A–18D.

Number of points. The number of points of the original sequence is a good discriminator. Given pictograms P and Q, with $n_p$ and $n_q$ points, the following normalized factor may be used:

$$f_1 = \frac{|n_p - n_q|}{max_n} \quad (9)$$

where $max_n$ is the maximum difference between the number of points of two pictograms in the database.

Figure 18A:
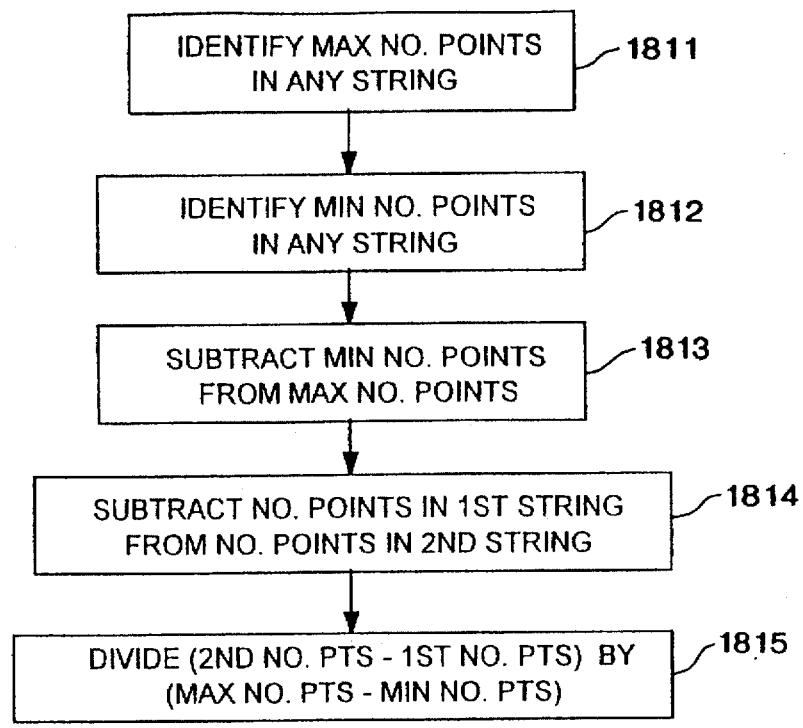
FIGS. 18A–18D are flow chart diagrams showing methods of extracting four global features from the strings in the index shown in FIGS. 2 or 8.

FIG. 18A is a flow chart diagram showing the exemplary method for determining the normalized maximum number of points. At step 1811, the maximum number of points in any of the strings in the database is identified. At step 1812, the minimum number of points in any of the strings in the database is identified. At step 1813, the minimum number of points is subtracted from the maximum to form the difference $max_n$. At step 1814, the number of points in the first string is subtracted from the number of points in the second string, and the absolute value of the difference is determined. At step 1815, the absolute value of the difference is divided by $max_n$, to form the normalized maximum number of points.

Maximum angle. Each stroke 1501–1514 (as shown in FIG. 15A) of the pictogram defines a maximum bounding box 1521–1534. The angle between the lower left corner of the first bounding box 1521 and the upper right corner of the tallest bounding box 1526 is defined as the maximum angle $\alpha$. $\alpha$ may be calculated as the arctangent of the quantity (the height of the tallest bounding box divided by the distance from the lower left corner of the first bounding box and the lower right corner of the tallest bounding box). The angle is a discriminating factor. Given $(\alpha_p)$ and $(\alpha_q)$ as the values for pictograms P and Q respectively, the normalized factor is computed as:

$$f_2 = \frac{|(\alpha_p) - (\alpha_q)|}{max_\alpha} \quad (10)$$

where $max_\alpha$ is the maximum difference founded in the database.

Figure 18B:
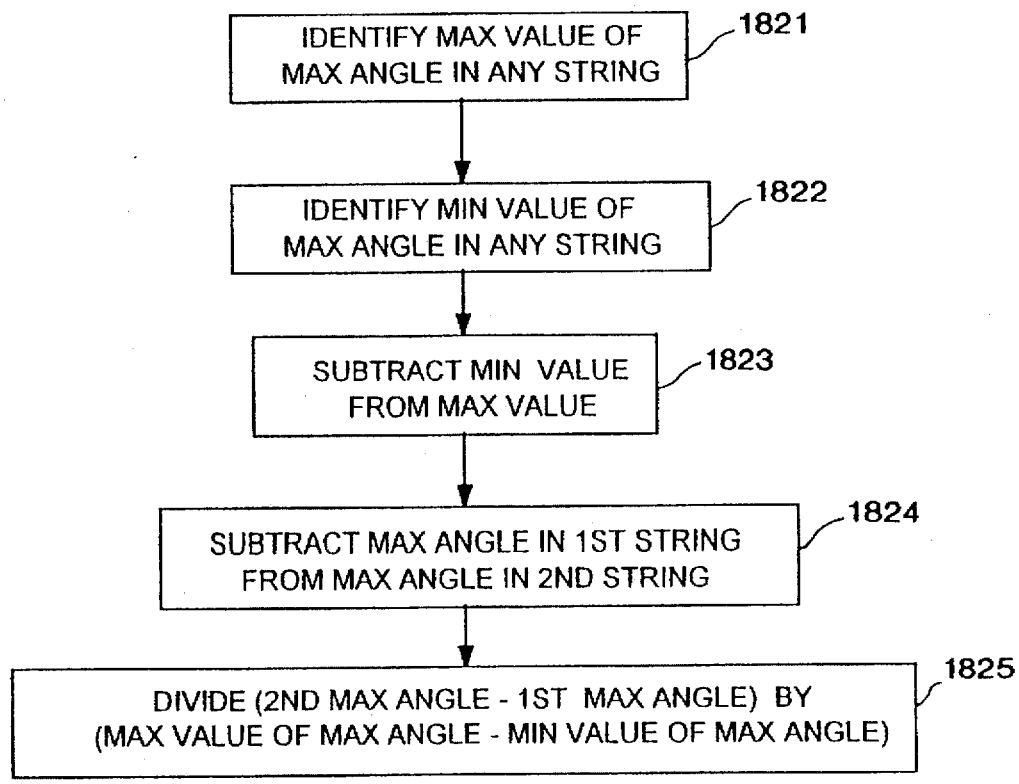

FIG. 18B is a flow chart diagram showing the exemplary method for determining the normalized maximum angle. At step 1821, the maximum value of the maximum angle in any of the strings in the database is identified. At step 1822, the minimum value of the maximum angle in any of the strings in the database is identified. At step 1823, the minimum value of the maximum angle is subtracted from the maximum value of the maximum angle to form a first difference, and the absolute value of the difference is determined. At step 1824, the maximum angle in the first string is subtracted from the maximum angle in the second string to form a second difference. At step 1825, the absolute value of the first difference is divided by the second difference, to form the normalized maximum angle.

Inversions. inversions are the number of times that the pen changes direction from upward to downward or vice versa. The change from downward to upward is referred to as a positive inversion, while the change from upward to downward is regarded as a negative inversion. If $i_p^+, i_p^-, i_q^+$ and $i_q^-$ are the number of positive and negative inversions of strings P and Q respectively, two normalized factors are defined as follows:

$$f_3 = \frac{|i_p^+ - i_q^+|}{max_i^+} \quad (11)$$

$$f_4 = \frac{|i_p^- - i_q^-|}{max_i^-} \quad (12)$$

where $max_i^+$ and $max_i^+$ are the maximum differences of positive and negative inversions among all of the strings in the database.

Figure 18C:
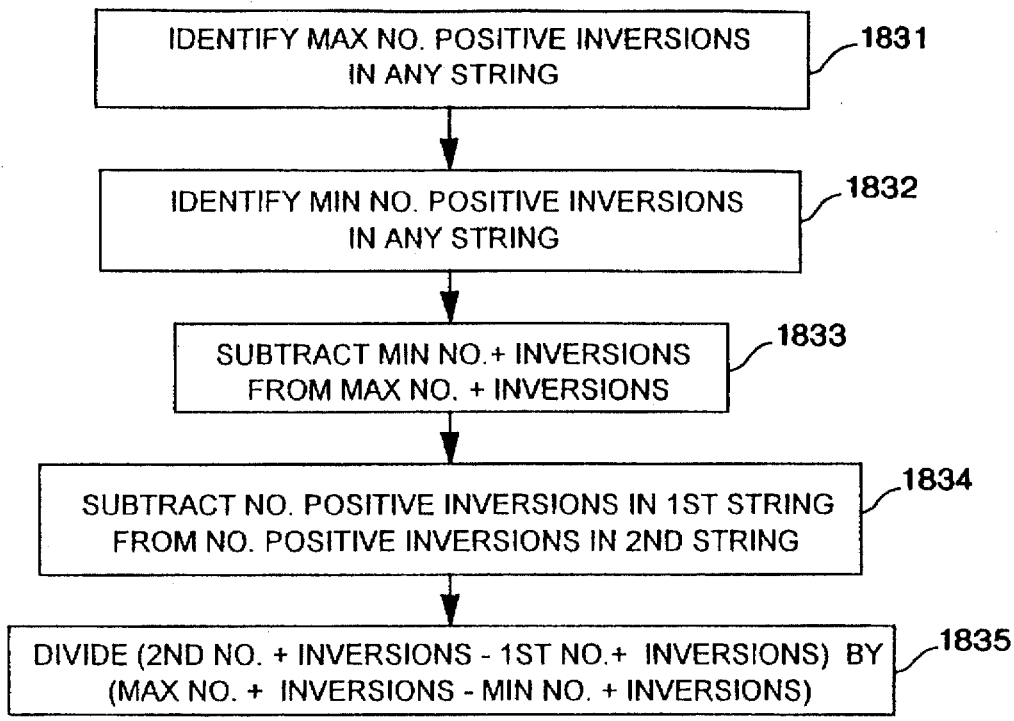

FIG. 18C is a flow chart diagram of the method for computing the normalized number of positive inversions. At step 1831, the maximum number of positive inversions in any of the strings in the database is identified. At step 1832, the minimum number of positive inversions in any of the strings in the database is identified. At step 1833, the minimum number of positive inversions is subtracted from the maximum number of positive inversions to form a difference, $max_i^+$. At step 1834, the maximum number of positive inversions in string Q is subtracted from the maximum number of positive inversions in string P to form a second difference, and the absolute value of the second difference is determined. At step 1835, the absolute value of the second difference is divided by $max_i^+$, to form the normalized maximum number of positive inversions.

Figure 18D:
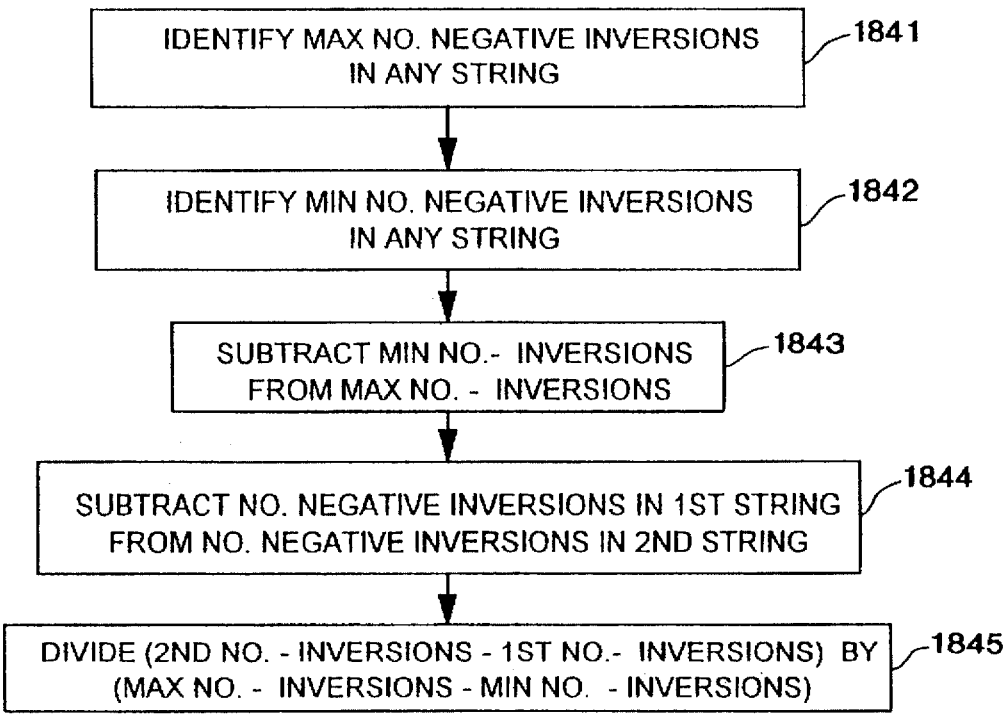

FIG. 18D is a flow chart diagram of the method for computing the normalized number of negative inversions. At step 1841, the maximum number of negative inversions in any of the strings in the database is identified. At step 1842, the minimum number of negative inversions in any of the strings in the database is identified. At step 1843, the minimum number of negative inversions is subtracted from the maximum number of negative inversions to form a difference, $max_i^-$. At step 1844, the maximum number of negative inversions in string Q is subtracted from the maximum number of negative inversions in string P to form a second difference, and the absolute value of the second difference is determined. At step 1845, the absolute value of the second difference is divided by $max_i^-$, to form the normalized maximum number of negative inversions.

According to another aspect of the invention, two global features $f_5$ and $f_6$ may be of particular use as part of a multi-stage analysis technique referred to below as "tandem matching."0 These two global features are:

(1) The difference in number of points. The number of points of the original sequence is a good discriminator. Given pictograms P and Q, with $n_p$, and $n_q$ points, the first absolute distance metric is defined by equation (13).

$$f_5(p,q)=|n_p-n_q| \quad (13)$$

Figure 15B:
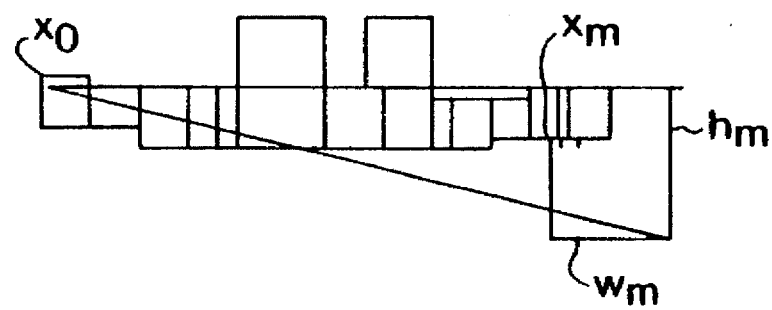

(2) Maximum angle. The maximum angle computation is shown in FIG. 15b. The maximum angle is computed as follows. Let $h_m$ be the maximum height of the MBR in the pictogram. Let $w_m$ be its width and $x_m$ the x coordinate of its leftmost corners. Let $x_o$ be the x coordinate of the leftmost corner of the first MBR. Then the maximum angle alpha is given by equation (14):

$$\alpha = \arctan \frac{h_m}{x_m - x_0 + w_m} \quad (14)$$

FIG. 15B shows the maximum angle for the pictogram "matching"0 segmented as shown in FIG. 15A.

The tangent of the angle $\alpha$ is used as a discriminating factor. Given $(\alpha_p)$ and $(\alpha_q)$ as the values for pictograms P and Q respectively, the distance is computed as:

$$f_6(p,q) = |\tan(\alpha_p) - \tan(\alpha_q)| \quad (15)$$

Another set containing 13 global features that may be used is as follows:

1. Number of strokes;
2. Number of points;
3. Number of positive inversions
4. Number of negative inversions
5. Total change in minimum bounding rectangle height (i.e., the accumulation of the absolute differences between the height of a stroke's MBR and that of its predecessor).
6. Total change in MBR length (i.e., the accumulation of the absolute differences between the length of a stroke's MBR and that of its predecessor).
7. Total change in MBR area (i.e., the accumulation of the absolute differences between the area of a stroke's MBR and that of its predecessor).
8. Total change in MBR angle (i.e., the accumulation of the absolute differences between the angle of the diagonal of a stroke's MBR and that of its predecessor).
9. Average area of the MBR's of all of the strokes.
10. Maximum angle: the angle of the line from the first point in the string to the point having the largest y-coordinate.
11. Number of thin strokes (i.e., strokes having a height greater than 1.5 times the width.
12. Stroke centroid: the position of the centroid of the stroke areas, calculated according to the formula:

$$centroid = \frac{\sum_{i=1,\ldots,s} i * Area(i)}{\sum_{i=1,\ldots,s} Area(i)} \quad (16)$$

where s is the total number of strokes in the string.

13. y-centroid: the position of the centroid of the stroke areas in the y-direction, calculated as:

$$y\text{-centroid} = \frac{\sum_{i=1,\ldots,s} (y_i - y_0) * Area(i)}{\sum_{i=1,\ldots,s} Area(i)} \quad (17)$$

where $y_i$ is the highest y value for stroke i, $y_0$ is the value of y for the first point of the string, and s is the number of strokes.

Global factors 1–13 above are of particular use in the R-Tree index described below with reference to FIG. 19.

Global distances do a poorer job in discriminating pictograms than edit distances such as VQD, described above, or inflection distance, described below. They are however effective in pruning out some of the items as being too distant to be close matches of the input string.

3. Inflection Distance

Figures 16A, 16B, 16C, 16D:
FIGS. 16A–16H show the eight types of strokes used for measuring an inflection distance between strings.
Figures 16E, 16F, 16G, 16H:
Figure 16I:
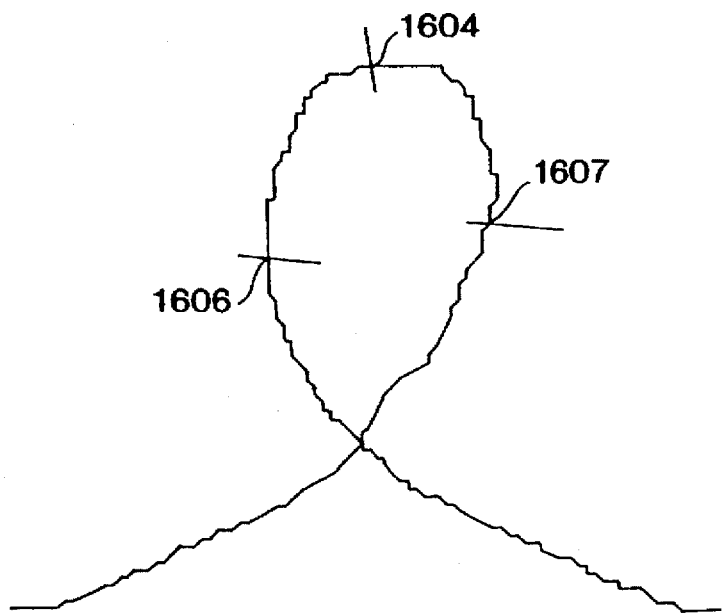
FIG. 16I shows how the strokes in FIGS. 16A–16H may be extracted from a character.

In a variation of the invention, ink may also be represented by a sequence of codewords (shown in FIGS. 16A–16H) that represent the inflection points of the pictogram. An inflection point marks the change of direction in the pictogram, e.g., going from an upwards direction to a downwards direction, or from a leftward direction to a rightward one. FIGS. 16A–16H show the eight possible types of inflection points 1601–1608. The reference numerals 1601–1608 are the corresponding codewords for the eight types of inflection points. FIG. 16I shows the inflection points on the pictogram representing the letter "e". The three inflection points (marked on the pictogram) translate to codewords "1607,"0 "1604,"0 and "1606,"0 respectively. So the representation of this pictogram by inflection codewords would be the string 1607, 1604, 1606. This representation of ink is used below to define a distance metric (referred to herein as the inflection distance, INFD) with which to compare ink items.

The inflection representation of the pictograms q and r may be used to compare them in an edit distance metric. For example, one may assume that only insertions and deletions are allowed and that each operation (insertion or deletion) has an associated cost of 1. This distance is referred to herein as the inflection distance between q and r, or INFD(q,r). With these assumptions, efficient algorithms may be used to compute INFD(q,r). A known edit distance algorithm may be used to compute a distance between two strings using only insertions and deletions. Such an algorithm runs in time proportional to nlog(n) where n is the size of the largest string. Computing INFD(q,r) is not only asymptotically faster than computing Lev(q,r), but is also faster for small strings.

To illustrate, consider the strings"

q="0, 4, 2, 7"

and r="0, 4, 2, 6"

The distance INFD(q,r) is 2, because it takes one deletion (7) and one insertion (6) to transform q into r.

FIXED QUERY TREE INDEX

According to another aspect of the invention, similarity matching may be achieved using a fixed-query tree 200 (shown in FIG. 2). Fixed query trees are described generally in Baeza-Yates et al., "Proximity Matching Using Fixed-Queries Trees", 5th *Combinatorial Pattern Matching*, LNCS 807, pages 198–212, June 1994, which is expressly incorporated by reference herein for its teachings on indexing and querying a database using fixed query trees.

FIG. 2 shows an example of an FQ tree 200. In FQ-trees, a key $q_0$, $q_1$, and $q_3$ is associated with every level of the tree and acts as a "fixed query."0 Each key $q_0$, $q_1$, and $q_2$ is a handwritten string, with respective values "1010,"0 "1101,"0 and "1011"0 Comparing a given string to the key at each level allows the system to determine into which subtree the string should be inserted. Subsequently, when querying the database, the FQ tree 200 is used to determine which subtree should be followed to retrieve strings that are similar to an input string. The comparison may be performed by using any distance function that obeys the triangle inequality of Equation (8). The set of all possible distances is finite and of the form "$d_0, d_1, \ldots, d_m$."0 Each node in the tree has exactly m children, one per possible distance value.

Given a set of strings X in the database and a distance function dist, an FQ-tree is a tree that satisfies the following four properties:

1. All elements of X are associated with the leaves of the tree. They are grouped in buckets of maximum size b. For example, in FIG. 2, the maximum size is two.

2. All non-leaf nodes of depth r are associated with a key $q_r$. The keys may be selected randomly or they may be members of S. In the example of FIG. 2, the keys $q_0$, $q_1$ and $q_2$ are randomly selected, and are not members of X.

3. Every non-leaf node v is the root of an FQ subtree associated with a subset $X_v \subset X$. This subset $X_v$ is formed by strings that are placed in buckets belonging to the subtree. The node v has m children, each defining a sub tree in the following way. Assume v is at level i of the tree and the fixed query at that level is $q_i$. Then the $j^{th}$ child of v defines a subtree associated with a subset $Xj=\{x \in X_v | dist(q,x)=d_j \geq 0\}$. In other words, strings in $X_v$ that are at a distance $d_j$ of $q_i$.

To simplify the exemplary fixed query tree of FIG. 2, tree 200 has only two possible symbols: zero and one. It is understood that much larger symbol alphabets are contemplated for use according to the invention (As defined by the possible combinations of the values of the 13 diminsional stroke feature space set forth above). Further, to simplify FIG. 2, a simple Hamming distance criterion is used (The Hamming distance between two strings is the number of symbols in identical positions that differ from each other and more elaborate distance functions may be used). As explained above, the aggregate distance may be used as the distance metric for the FQ tree index 200.

At level 1, there are four possible distance values from $q_0$: 1, 2, 3 and 4. A respectively different subtree is associated with each distance value. Nodes 221, 222, 223 and 224 are associated with the respective distance values 1–4. Each of the nodes 221 and 223 has a single child, which is a leaf node, 210 and 211 respectively. The string in leaf 210 has a distance of 1 from $q_0$ and a distance of 2 from $q_1$. The strings in leaf 211 each have a distance of 2 from $q_0$ and a distance of 3 from $q_1$. The subtree having node 223 as a root has three strings. Because the number of strings exceeds the maximum bucket size of 2 for this example, two leaves 212 and 213 are required. All of the strings in leaves 212 and 213 have a distance of 3 from $q_0$ and a distance of 2 from $q_1$. The strings in leaf 212 have a distance of 2 from $q_2$ and the string in leaf 213 has a distance of 4 from $q_2$.

Figure 3:
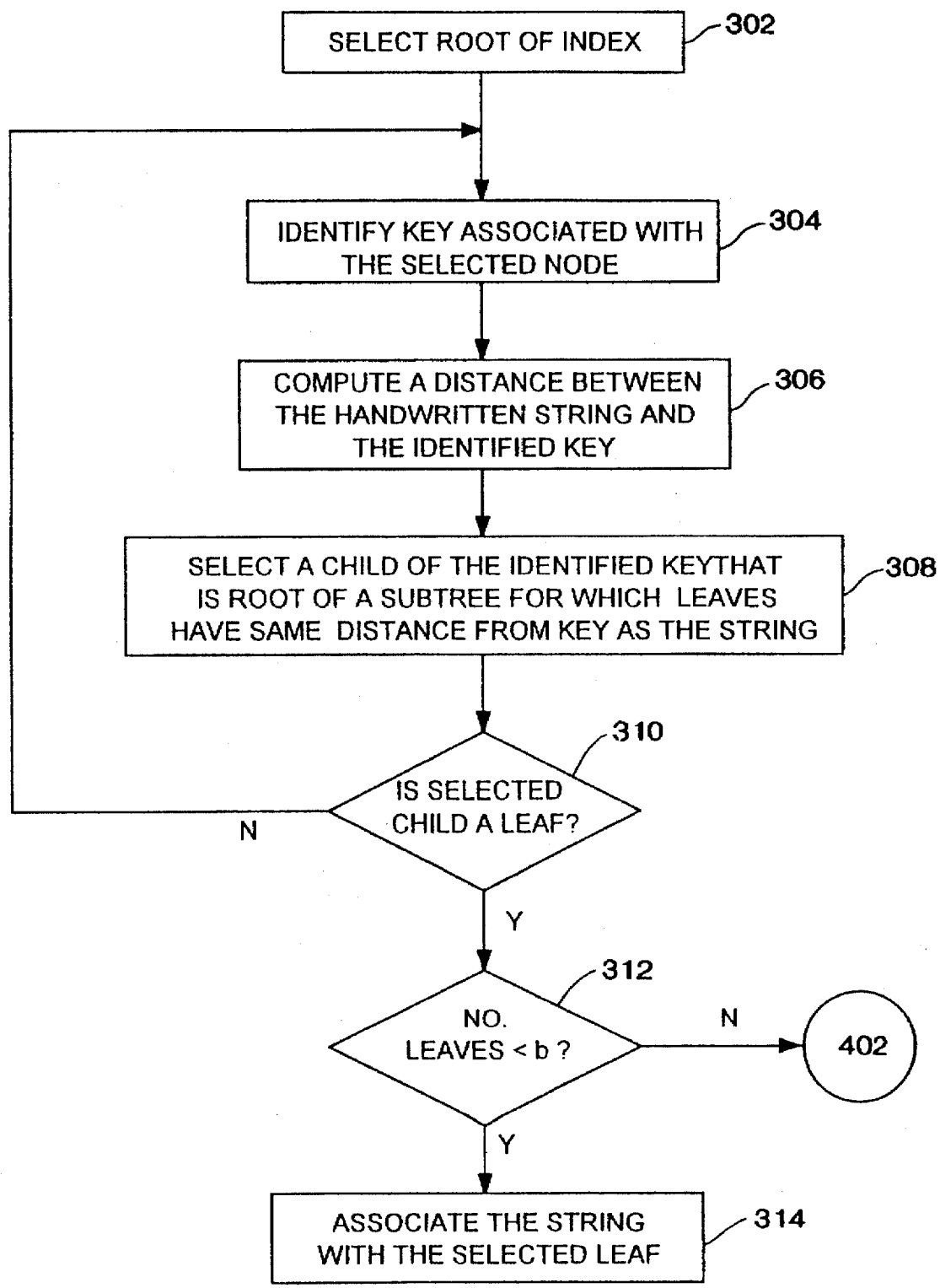
FIG. 3 is a flow chart diagram of an exemplary method for inserting a string in the index of FIG. 2.

FIG. 3 is a flow chart diagram of a method for inserting a string in the FQ-tree index 200. To insert a string P in the tree 200, at step 302, the root node 220 is first selected. At step 304, the key associated with the selected node is identified and at step 306, the distance between P and $q_o$ (the query associated with level 0) is computed. The value of the distance determines which children of the root node 220 are to be examined next. At step 308, for each level i, when a non-leaf is encountered, e.g., node 223, the distance between $q_i$ and P is computed, to determine which child needs to be followed. The child that is root of a subtree for which the leaves have the same distance from the key as the string P is selected. At step 310, a check is made whether a leaf node has been reached. The iteration of steps 304–310 ends when a leaf is found. The string P is to be inserted in the bucket associated with that leaf. At step 312, a determination is made whether a new bucket must be established. There are two possible scenarios:

1. The bucket has less than b items. In this case, at step 314, the string P is associated with the selected leaf, and P is inserted in the bucket.

2. The bucket already has b items. Because inserting P would cause the bucket to "overflow,"0 the leaf is split. Control is transferred to step 402 in FIG. 4.

Figure 4:
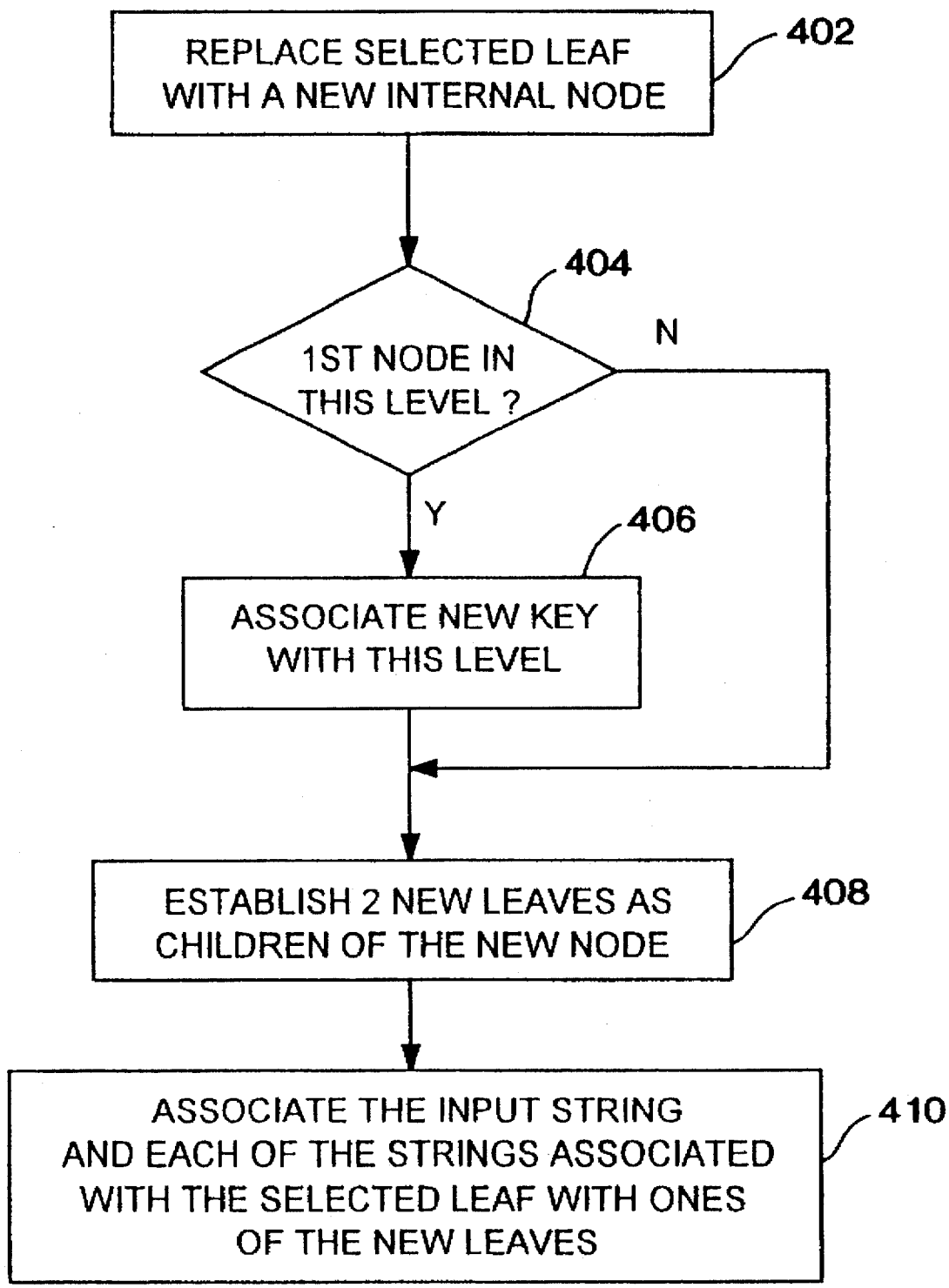
FIG. 4 is a flow chart diagram of a method of splitting one of the leaves in the index shown in FIG. 2.

FIG. 4 is a flow chart diagram showing the method for splitting a leaf in the FQ tree 200. In doing so, the leaf is replaced by a node v with m children, each one having an associated bucket. Assume v is at level k of the tree. Each item in the old bucket needs to be assigned to one of the m buckets recently created. To do that, a fixed-query is needed.

At step 404, if a fixed-query $q_k$ exists for level k (i.e., this node is not the first one at that level), then control transfers to step 408, and the existing query is used for the purpose of allocating items in the buckets. If v is the first node in level k at step 404, then at step 406, a new fixed-query needs to be selected and associated with this level. The new key may be a string in the database, or a random string. At step 408, two new leaves are established as children of the new node. At step 410, the newly inserted string and all of the strings in the leaf that is being replaced are associated with respective ones of the two new leaves. Given a string x in the old bucket, the distance between x and $q_k$ is computed. That distance determines into which child's bucket x is placed.

Figure 5:
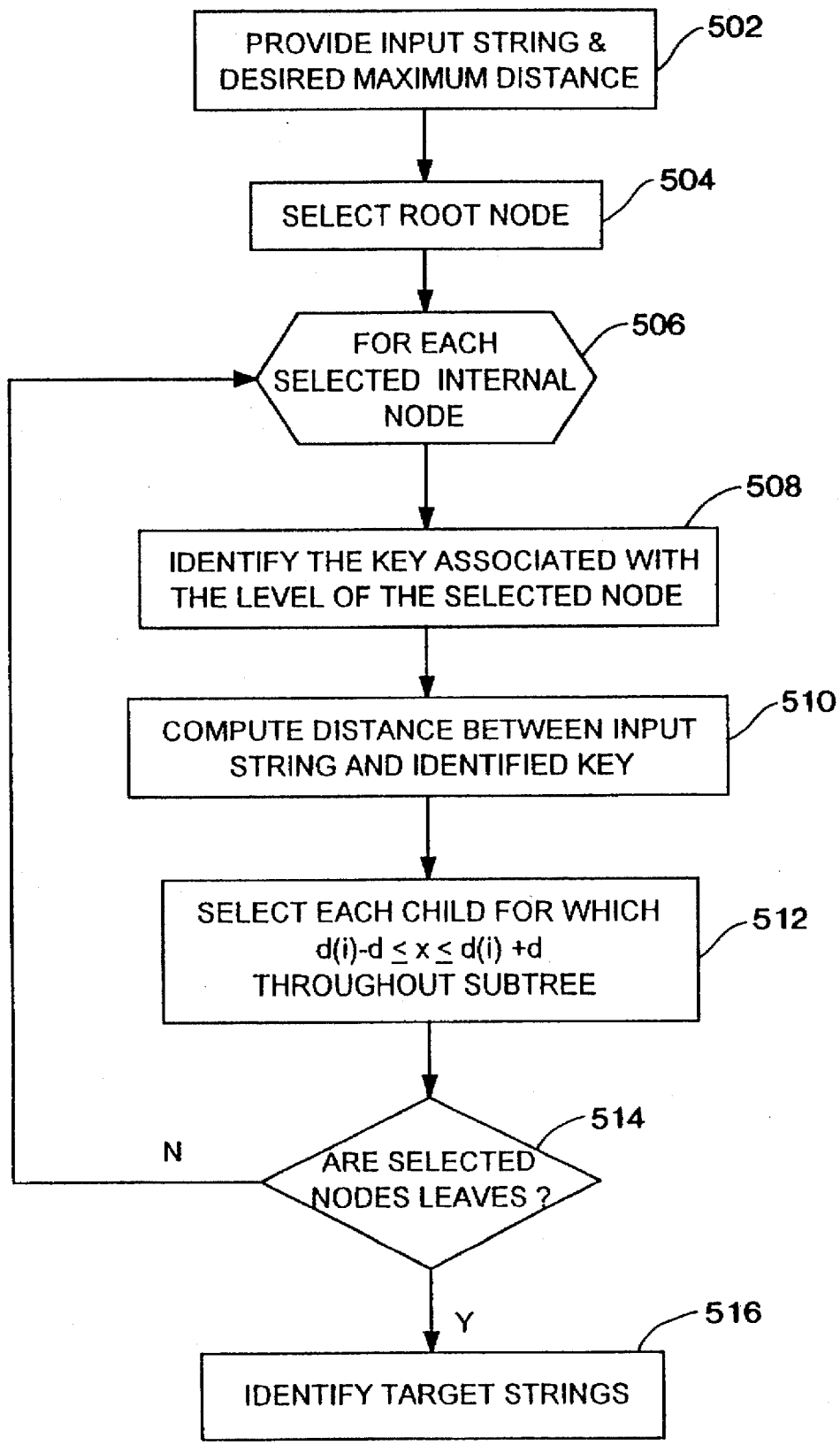
FIG. 5 is a flow chart diagram of an exemplary method of querying a database using the index shown in FIG. 2.

FIG. 5 is a flow chart diagram of a method for querying the FQ tree 200. To search for strings within a desired maximum threshold distance d to a given input string (query) q, the following steps are performed. At step 502 an input string is provided. At step 504, the root node is first selected.

Steps 506 through 514 are performed recursively as follows. At step 508, the key associated with the level i of the selected node is identified. At step 510, if the node at level i is a non-leaf node v, the distance $dist(q,q_i)=d_i$ between the input string q and the key $q_i$ for level i, is computed At step 512, the children within the range $[d_i-d, d_i+d]$ are all selected. At step 514, if the selected nodes are not leaves, then control returns to step 506, and steps 508–514 are repeated for each of the selected nodes; all children of v with distances in the range $[d_i-d,d_i+d]$ are searched, recursively. When execution of step 514 determines that the selected nodes are leaves, control passes to step 516, and the strings pointed to by the leaves are identified as being found by the query.

Figure 6:
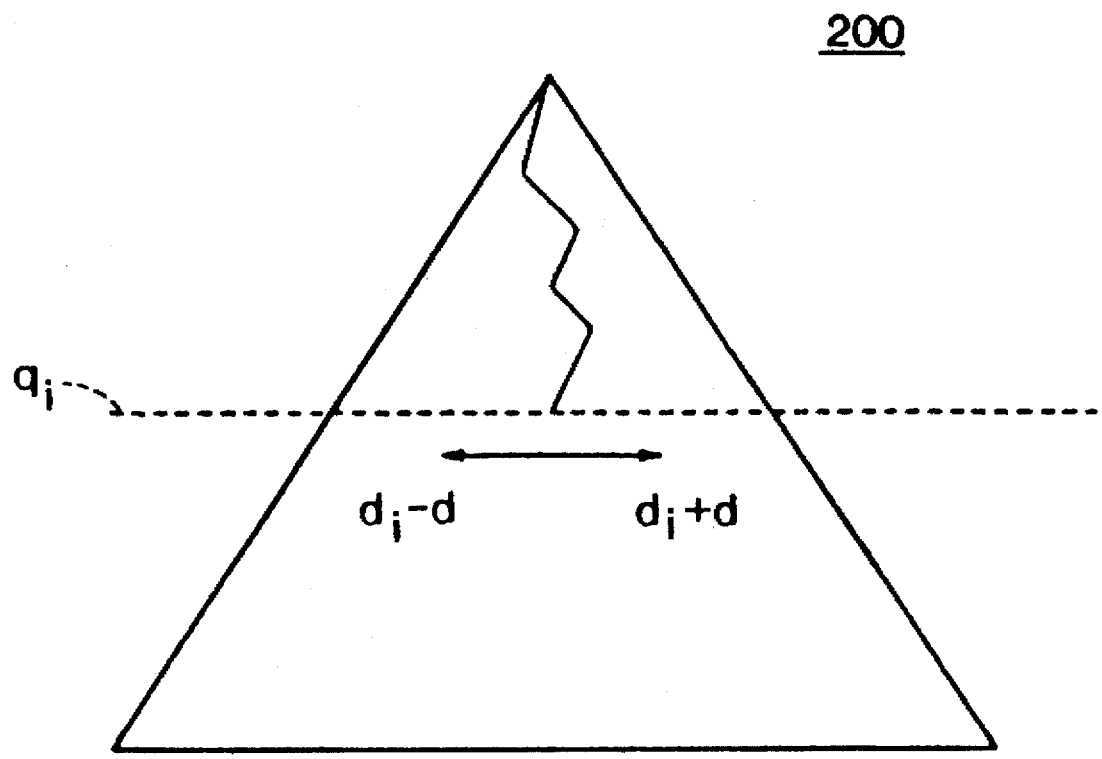
FIG. 6 is an diagram showing how the tree of FIG. 2 is traversed.

The triangle inequality of equation (8) guarantees that every element of the FQ tree within distance d of the input string q must be in one of the subtrees defined by the range $[d_i-d, d_i+d]$. (This general property of FQ trees is explained in the publication by Baeza-Yates et al., referenced above). No child outside this range can contain any string within a distance d from the input string q. FIG. 6 shows the range of subtrees defined by $[d_i-d, d_i+d]$ at each level of tree 200.

A small number of elements that are at a greater distance than d may also be picked up when querying an FQ tree. These are filtered out by further processing. According to a further aspect of the invention, a particular set of further processing steps have been determined to effectively filter out strings that do not closely match the input string. This set of steps is referred to as "tandem matching,"0 and is explained below, in the section entitled, "TANDEM MATCHING."0

The FQ tree has the following advantage. For each level (except the level of the leaf nodes), it is only necessary to perform a single distance computation during a query. In the level of the leaf nodes, one distance computation is performed for each string in each of the leaves that are found by the query, to filter out the strings that are actually outside of the range $[d_i-d, d_i+d]$. This approach is a fast one when compared with sequential search. The answer obtained to a query q and a distance d is referred to hereinafter as $X_{q,d} \subset X$.

The selection of a distance metric that obeys the triangle inequality is thus important to enable the system to find all of the nodes within a desired maximum threshold distance of an input string by performing a single distance computation at each internal level of the index. Two exemplary distance metrics may be used: the Levenshtein distance and the aggregate distance (described above), in addition to other metrics that obey the triangle equality. In the first exemplary embodiment, the function $dist_1$ is the aggregate distance, $df_1, f_2, f_3, f_4$ defined above.

A variety of configurations for the FQ tree index may be used. An implementation of the FQ-tree was constructed in a DEC-Alpha workstation. Two systems were built. The first one keeps the entire FQ-tree in main-memory 150. The second one uses a disk-based implementation. FQ trees using the Levenshtein distance metric and the aggregate distance metric were constructed in each hardware implementation. For the sequential search (to check for strings outside the range $[d_i-d, d_i+d]$, after the subset of strings is selected), the aggregate distance was used.

In one embodiment, the FQ tree is stored in a disk, with a small portion of the index containing the most recently used pages of the index stored in main memory. A variety of bucket sizes between 50 and 500 were used, along with a cache size of 1024 bytes. Each pictogram in the database may be kept as a compressed TIFF file and occupies about 1.2 Kbytes of memory.

The inventors have determined that using the Levenshtein distance as the distance metric results in faster search than the aggregate distance, at the expense of a poorer matching rate.

In general, the search time decreases as the bucket size increases. This is due to the effect on the height of the tree. Bigger bucket sizes imply that the leaves are split fewer times as items are inserted in the database, making the height of the tree smaller. This in turn reduces the number of comparisons and the number of pages that are fetched from the disk.

The space overhead incurred by FQ-trees is low relative to the size of the data, making the tradeoff of memory for processing time advantageous.

Although the search times for larger databases keep growing linearly with the database size, FQ-trees provide a significant reduction of search time with respect to sequential search. In this sense, FQ-trees act more like filters than indices, pruning a constant fraction of the database. An explanation for this behavior may be that cursive handwriting data is very skewed. Strings are clustered with respect to the distance metrics used. Even though the metrics do a good job in matching the right data with the query, very often most of the pictograms may be found in a few buckets adjacent to each other. The search procedure then picks up a relatively large subset of the database.

One solution is to subject the solution set S1 returned by the FQ tree to a series of further processing operations referred to as "tandem matching,"0 as described below.

In a variation of the exemplary embodiment, the buckets are implemented as indices rather than as lists of items. In this way, the final stage of the algorithm would traverse another index, avoiding the sequential search of each bucket found by the search. One possibility is the usage of R-trees at that level, using the global features as dimensions of the tree.

TANDEM MATCHING

Given an input pictogram q, tandem matching may be used to find out which items r in the database are the closest matches to q. The distance metrics described above (edit distance, global features, and inflection distance), when used alone, may not be powerful enough to perform similarity matching of pictograms to a desired level of accuracy, specially when the number of pictograms in the database is large. This is important for using the FQ tree, because accuracy of the solution set S1 provided by the FQ tree depends on the accuracy of the distance metrics used to index the strings. In the exemplary embodiment, the aggregate distance (based on Levenshtein distance and four global features) is used.

Combining edit distance, global features and inflection distance may achieve excellent results. Referring again to FIG. 7, an exemplary method of subjecting the pictograms to several stages of matching is shown. This procedure is called tandem matching, because the metrics are used in tandem fashion.

The beginning of the process is establishment of an FQ tree at step 702. At step 704, a plurality of features are extracted from the handwritten objects. A plurality of features are extracted from each stroke. Global features may be computed for each string, or the individual symbol features may be used. In the exemplary embodiment, global features are used for indexing the. At step 706, a key is associated with each level of the tree. In the exemplary embodiment, the keys are random strings. At step 708, as each handwritten string is added to the database, it is associated with one of the leaves of the tree. In step 710 and 712, the FQ tree is queried.

As noted in the discussion of FQ trees above, given a query q with a desired maximum distance d, the FQ tree returns a set $S_1$ at step 714, including all of the strings in the desired range [q−d, q+d], plus a small number of strings outside of the desired range. Further processing is needed to weed out those strings that are outside of the range [q−d, q+d], and possibly to narrow the range further.

At step 716, the first two distance metrics used are global distances $f_5$ and $f_6$, defined by equations (13) and (14), above. Threshold distances $t_1$ and $t_2$ are defined, so that only strings within both of these thresholds are considered further. These metrics prune out some of the pictograms that are essentially too far away from q to be a good match. Because they are (computationally) the cheapest of the three kinds of metrics described above, they represent a quick way of eliminating poor choices for matching. At step 718, these metrics produce a subset $S_2$ of items that pass the threshold tests.

Next, at step 720, the inflection distance metric INFD(q,r) is applied to this subset ($S_2$) of items. This metric reduces the choices even further to those contained in subset $S_3$. At step 722, the subset $S_3$ is ranked by the value of INFD(q,r) in increasing order, and the first j items are selected (where j is a maximum desired number of strings in the set $S_3$). At step 724, the first j items of the ranked subset are subjected to a final screening using the metric INFD(q,r)+VQD(q,r). Note that INFD(q,r) is computed in the previous step 720, so the computational effort of step 724 is essentially equal to that of computing VQD. Applying VQD as the last stage in the tandem processing makes sense because this is the most expensive metric of them all. By the time VQD is applied at step 724, the number of strings in the solution set $S_3$ has been reduced considerably by the other metrics. The output of step 724 is a ranked subset of the strings, $S_4$. Finally, at step 726, the first k choices of the ranked subset $S_4$ (where k is a maximum desired number of strings in the solution set) are selected as the best matches for q. (For instance, one may be interested in displaying the best k=5 matches in the database in a browser, from which the user can select a string.)

Applying tandem matching to the entire database would an expensive proposition (in terms of processing time), especially if the database size is large. Tandem matching is most efficient if the database items are indexed in such a way that the initial subset S which is subjected to tandem matching is as small as possible. In this way, AIM can scale to repositories that contain large numbers of pictograms. One exemplary method of providing a reduced set of strings for tandem matching is using the FQ-trees described above.

According to another aspect of the invention, the multi-stage processing of the tandem matching method may be applied to other indexing methods as well. For example, tandem matching may be used in conjunction with the indexing method set forth in U.S. patent application No. 08/248,392, filed May 24, 1994 and in 08/324,231, filed Oct. 17, 1994 (which are expressly incorporated by reference herein for their teachings on the use of Hidden Markov Models to index handwritten objects). The candidate set of objects identified by the index of 08/248,392 or 08/324,231 may be reduced using the steps 716–726 of FIG. 7.

According to another aspect of the invention, the strings in the database may be filtered using an R-tree index, as described below, prior to performing tandem matching.

R-TREE INDEX FOR SIMILARITY MATCHING

R-tree indexes are described generally, above, with reference to FIGS. 8 and 9. According to the invention, the feature values of the strokes may be stored in a multidimensional index such as the R-tree 800. As described with reference to FIG. 10, the leaves of the R-tree may contain strokes and pointers to the strings containing the strokes.

In this section, the use of the R-Tree index is described in detail. This index allows fast retrieval of similar strings and can handle insertion, deletion, substitution errors and substring matching. The index is dynamic in the sense that insertion and deletion operations may be intermixed in real time with the search operations. Given a search query string, the answer is a set of the strings or substrings that look like the query string.

Due to the variability in handwriting, the feature vectors that correspond to different instances of one stroke tend to vary slightly. The vectors that represent the different instances of the same stroke form a cluster in the feature space. Thus, strokes that look similar have their representative clusters close to each other or even overlapping in the multi-dimensional space. Given a string S, the stroke segmentation program decomposes S into a sequence of t strokes. Each stroke is represented as a point in the multi-dimensional features space, which are stored in the R-tree index 800.

In the exemplary embodiment, each R-tree node occupies one disk page. Non-leaf nodes, which are small in number, may be kept in main memory, while leaf nodes may be stored on disk. A set of points that are close to each other are stored in the same leaf node.

Figure 11A:
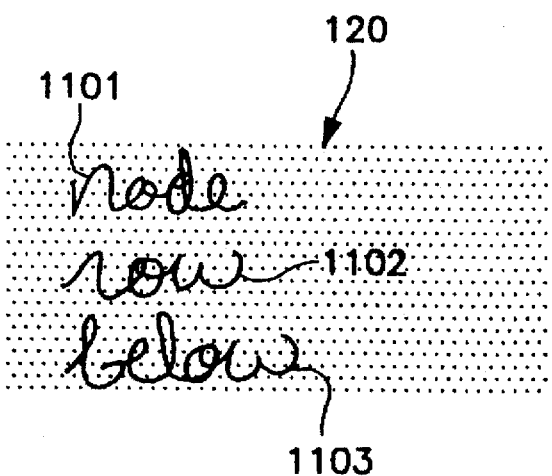
FIGS. 11A and 11B show three handwritten strings and their representations in the index shown in FIG. 8.

FIG. 11A shows an example of three cursive words: "node,"0 1101 "row,"0 1102 and "below"0 1103, as written on the digitizing pad 120. To simplify this example, it is assumed that each stroke is described by only two features, f1 and f2, so that the strokes may be shown completely in a two dimensional diagram, such as FIG. 11B. (As explained above, the exemplary feature space actually includes 13 features, but it would be difficult to show this in a two dimensional diagram). Further, each stroke in the example represents a letter in one of the three strings 1101–1103 (As explained above, the exemplary strokes in the tree 800 are actually defined by successive Y-minima).

Figure 11B:
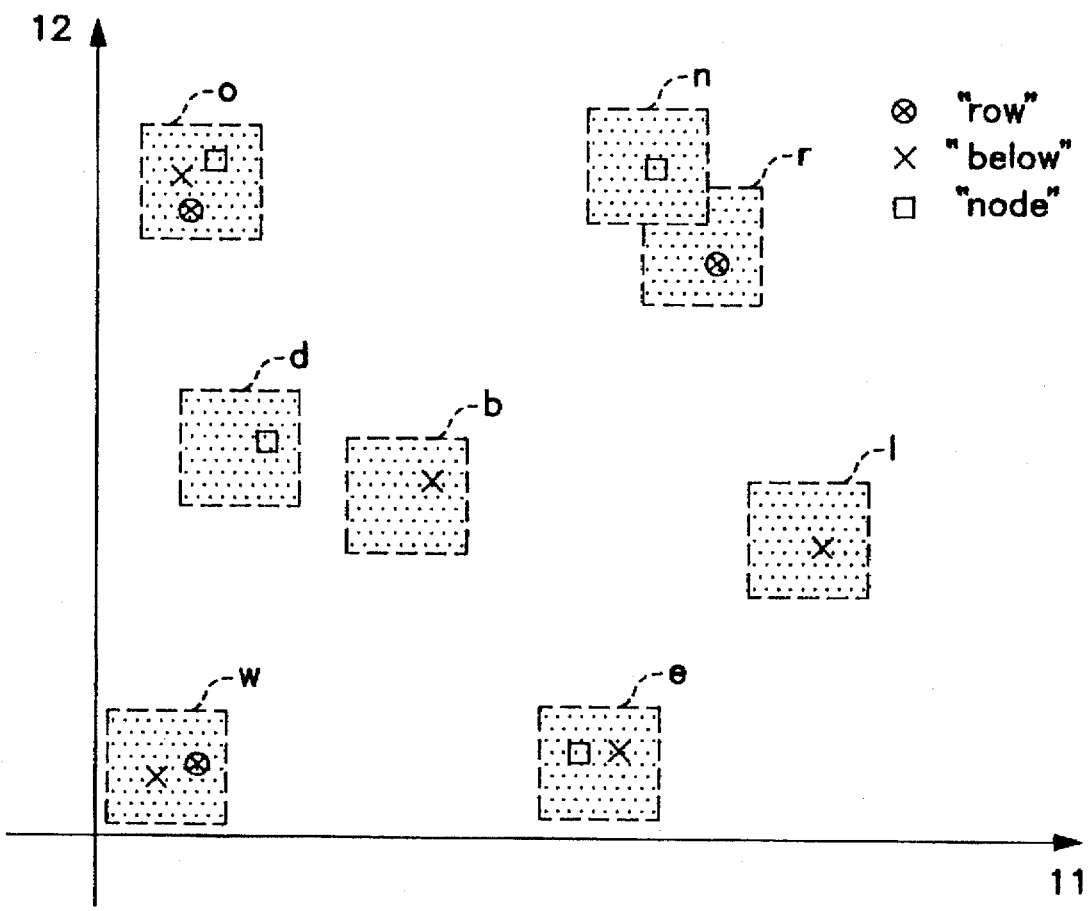

FIG. 11B shows the representation of the three strings 1101–1103 in the f1–f2 space. Each string 1101–1103 is represented by several points (equal to the number of strokes in the string) in the two dimensional f1–f2 space. Strokes that represent the same letter tend to form a cluster (e.g., the letter "o"0 in all three strings, the letter "w"0 in "row"0 and "below", and the letter "e"0 in "below"0 and "node."0 The rectangular areas in FIG. 11B show the clusters for each individual letter (stroke). Letters that are written in a similar way (e.g., r and n) may have clusters close to each other, or the clusters may even overlap, as shown.

Figure 12A:
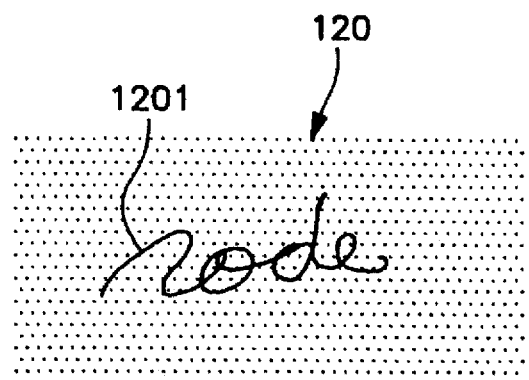
FIGS. 12A and 12B show an input query string used to query the database which includes the strings shown in FIG. 11A, and the representations of the query string.
Figure 12B:
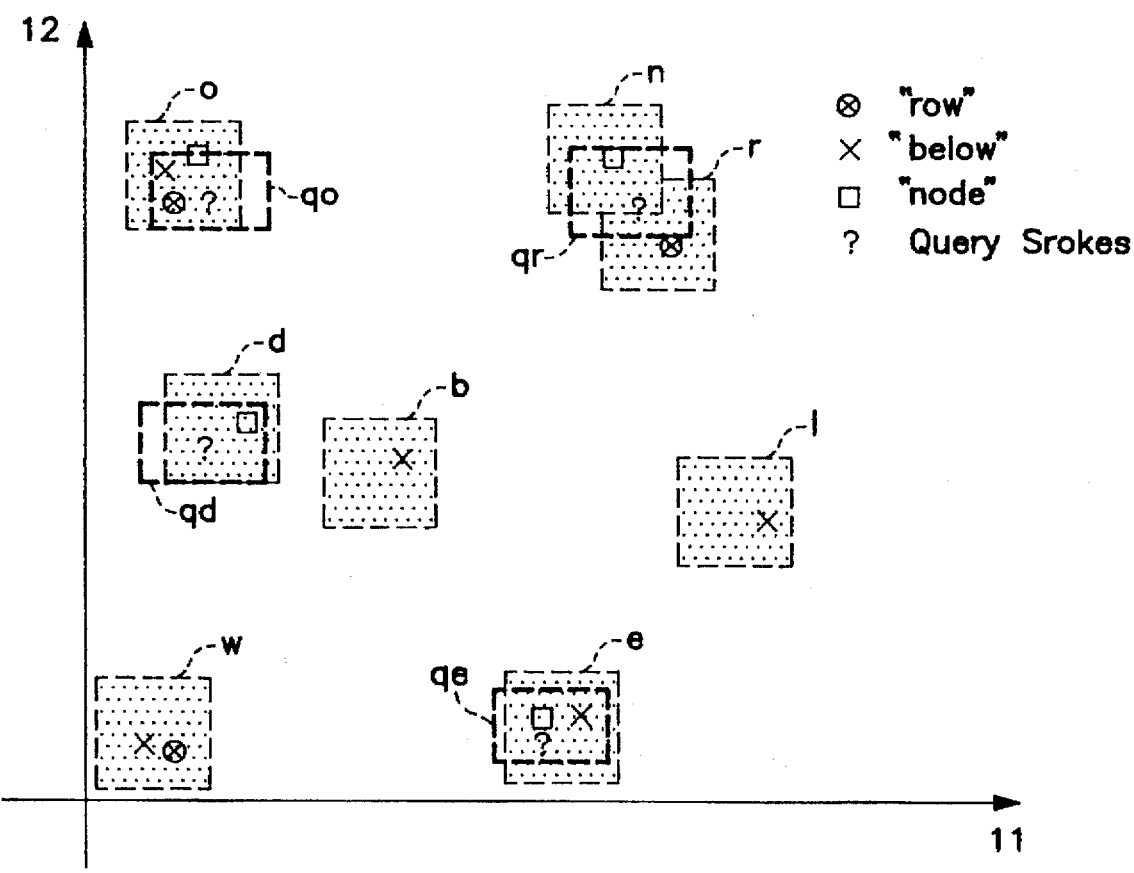

FIGS. 12A and 12B show an example of a similarity matching search of the database shown in FIGS. 11A and 11B. In the example of FIG. 12A, the string 1201 "rode"0 is input. As shown in FIG. 12B, the four range queries $q_r$, $q_o$, $q_d$ and $q_e$ are formed from the input string 1201. Each range query is a hyper rectangle (in f1–f2 space) centered about a respectively different stroke of the input string. The database is assumed to contain the three cursive words "node, 'row", and "below,"0 as shown in FIG. 11B. Insofar as the search is concerned, it does not matter whether the user is looking for the word "node"0 (in which case the letter "n"0 is incorrectly written to resemble the letter "r"), or the user is looking for the word "rode,"0 which is not stored in the database. The search finds strings in the database that have strokes similar to "r,"0 "o,"0 "d"0 and "e."

The output of each range query $q_i$ is a set of word-ids. The set includes each word which contains a stroke lying within the boundary of the range query contour $q_i$. Each of these words contains a stroke that is similar to one of the query strokes. This set is referred to as the candidate set C. A simple voting algorithm is applied as follows. Each word-id has a score that indicates how many times it appears as an answer for the queries $q_i$, 1<i<x, where x is the number of strokes in the input string associated with that word-id. The set of word-ids that have the highest scores are reported as the answer.

Note that no expensive operations (in terms of processing capacity) are performed in the search; nor are any of the pictographic representations of the strings in the database accessed to perform the range query checks. For each feature in the input stroke, two comparisons are performed to determined whether the feature value of a stroke in the database is greater than a minimum limit of the range query and less than a maximum limit of the range query. For example, for a 13-dimensional feature space, 26 comparisons are performed. The results of the range query are subjected to a Boolean "AND"0 operation; if both results are "TRUE,"0 then the stroke in the database satisfies the range query.

As shown in FIG. 12B, each of the range queries $q_r$, $q_o$, $q_d$ and $q_e$ overlaps a respective one of the ranges "r,"0 "n,"0 "o,"0 "d,"0 and "e."0 In this case, the stroke that corresponds to the query $q_r$ lies somewhere between the two clusters that correspond to the letters "r"0 and "n."0 Using the appropriate value to define the size of the range query, the answer set for the stroke $q_r$ includes the two strings "node"0 and "row".

Table 1 shows the output of the voting algorithm when applied to the query shown in FIGS. 12A and 12B. The word "node"0 has the highest score (score=4), because four of the range queries $q_r$, $q_o$, $q_d$ and $q_e$ corresponding to the four strokes in the query string contain strokes of the word "node."0 The word "row"0 has a score of 2, because two of the range queries $q_r$, $q_o$, contain letters "r,"0 and "o"0 of the string "row". Similarly, the word "below"0 has a score of 2 because two of the range queries $q_o$, and $q_e$ contain letters "o"0 and "e"0 of the string "below."

TABLE 1

| Word | Voting Score |
|---|---|
| "node" | 4 |
| "below" | 2 |
| "row" | 2 |

Figure 13A:
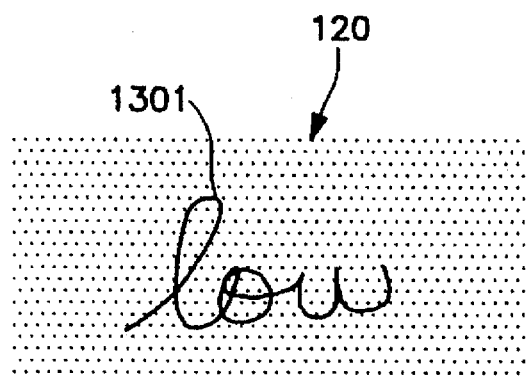
FIGS. 13A and 13B show a further input query string used to query the database which includes the strings shown in FIG. 11A, and the representations of the query string.
Figure 13B:
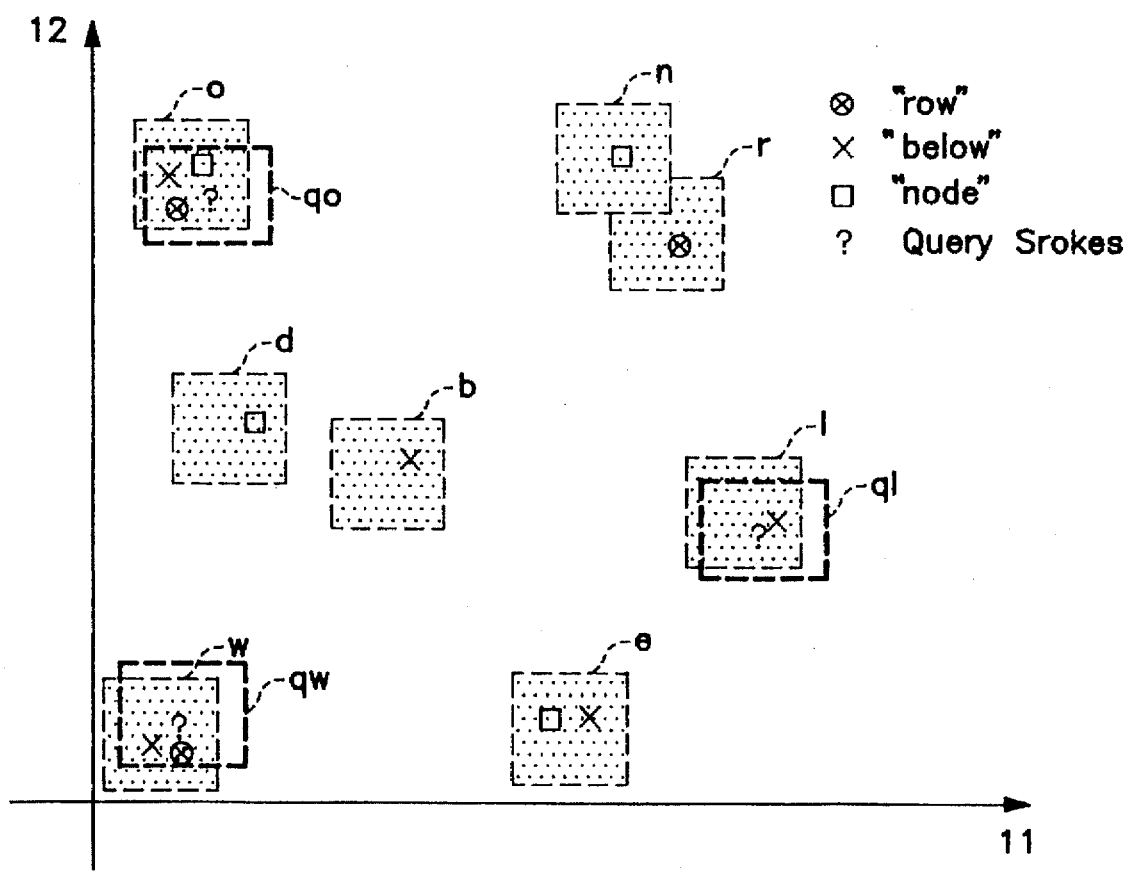

FIGS. 13A and 13B show how the R-tree index 800 may be queried using a substring matching query. For example, if the user wants to retrieve all the strings that contain the substring "low,"0 then three range queries $q_l$, $q_o$ and $q_w$ are formed, one query for each stroke in the query string "low."0 Table 2 shows the output of the voting algorithm. The word "below"0 has the highest score (3). Substring matching queries use the same algorithm as full string matching. This aspect of the R-Tree index makes it particularly attractive.

TABLE 2

| Word | Voting Score |
|---|---|
| "below" | 3 |
| "row" | 2 |
| "node" | 1 |

In the exemplary embodiment, the minimum bounding contours are hyper-rectangles, hereafter referred to as minimum bounding rectangles (MBRs). Other minimum bounding contours, such as circles may also be used. Although the use of circles is more accurate for limiting the distance between strings, rectangles are computationally simpler, and the matching computations proceed more quickly if hyper-rectangles are used (especially if the number of features is greater than two). Hereafter, whenever the term MBR is used, it is understood that other contours besides hyper-rectangles may also be used.

The main advantage of the R-tree 800 is the potential for parent nodes to overlap. In this way, the R-tree may guarantee at least 50% space utilization and at the same time remain balanced.

REDUCING THE SIZE OF THE R-TREE INDEX

This section explains how the index size and the size of the candidate sets may be reduced.

Suppose the database repository contains n strings. Each string contains, on average, t strokes. The space requirement for the index is proportional to n×t. This amount may be considerable, especially for a large database. The goal here is to reduce the number of features needed to describe the stroke by transforming the data points into another space with fewer dimensions. This problem is known as dimensionality reduction.

In the above description, 13 highly correlated features are used to describe each stroke. The Karhunen-Loeve transform (described in Gersho et al., *Vector Quantization and Signal Compression,* "Hotelling transform or principal Component analysis,"0 Kluwer Academic, 1992., which is expressly incorporated by reference for its teachings on features dimensionality reduction) may be used to reduce the dimensionality of the feature space. The transform maps a set of vectors to a new feature space with an orthogonal uncorrelated axis. The Karhunen-Loeve transform consigns most of the discrimination power to the first few axes. This technique may allow use of only k axes, k<13, losing little information while reducing the index size significant.

The axes of the new feature space are the eigen vectors of the autocorrelation (covariance) matrix for the set of data points. The Karhunen-Loeve transform sorts the eigenvectors in decreasing order according to the eigen values, and approximates each data vector with its projections on the first k eigenvectors, k<13.

A small sample is collected from the writer in advance and the Karhunen-Loeve transform is applied to calculate the vector transformation matrix. All strokes (vectors) are mapped to the new space and then inserted in the index.

Figure 14A:
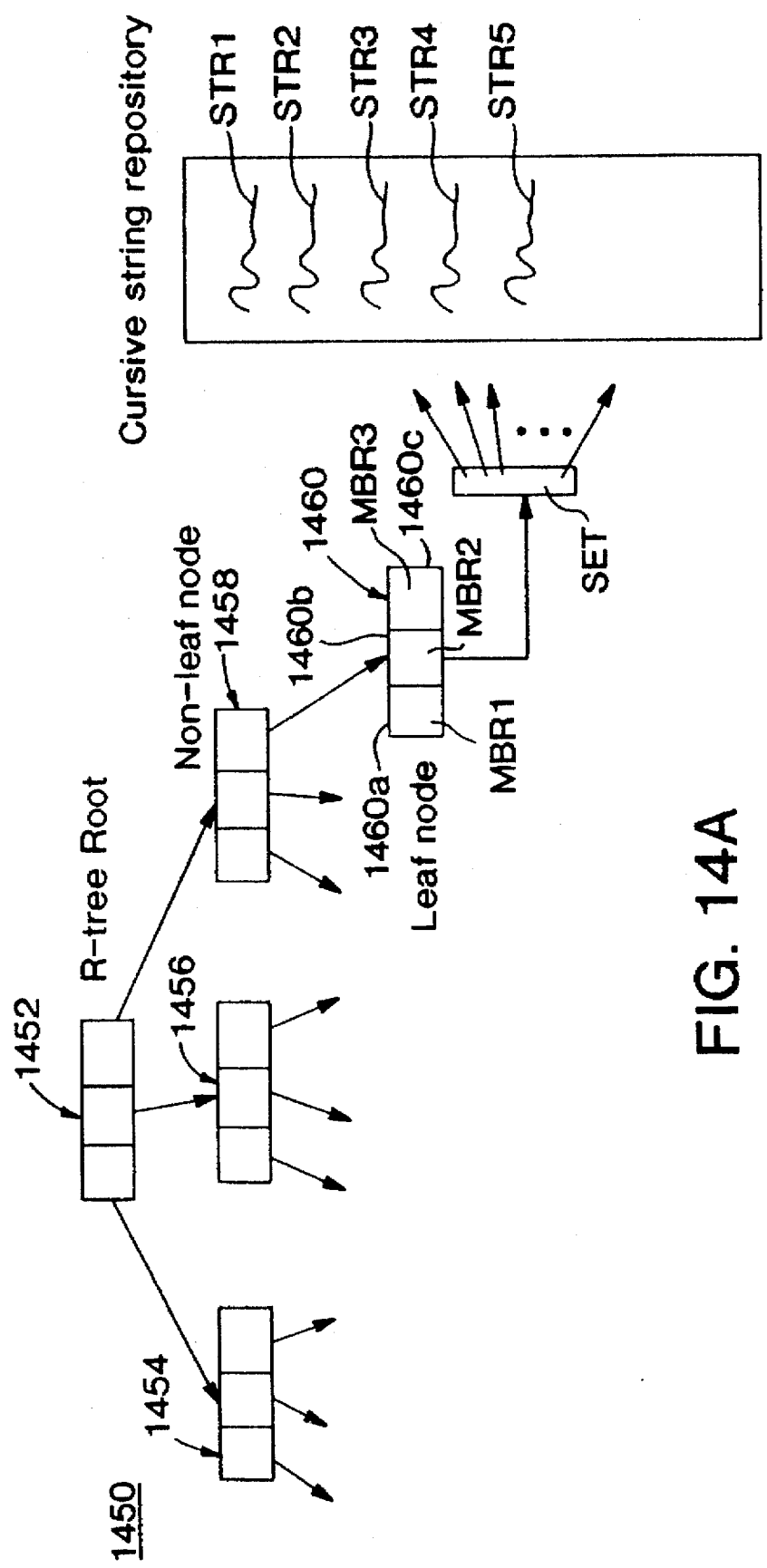
FIG. 14A is a diagram of a second exemplary R-Tree index according to the invention.
Figure 14B:
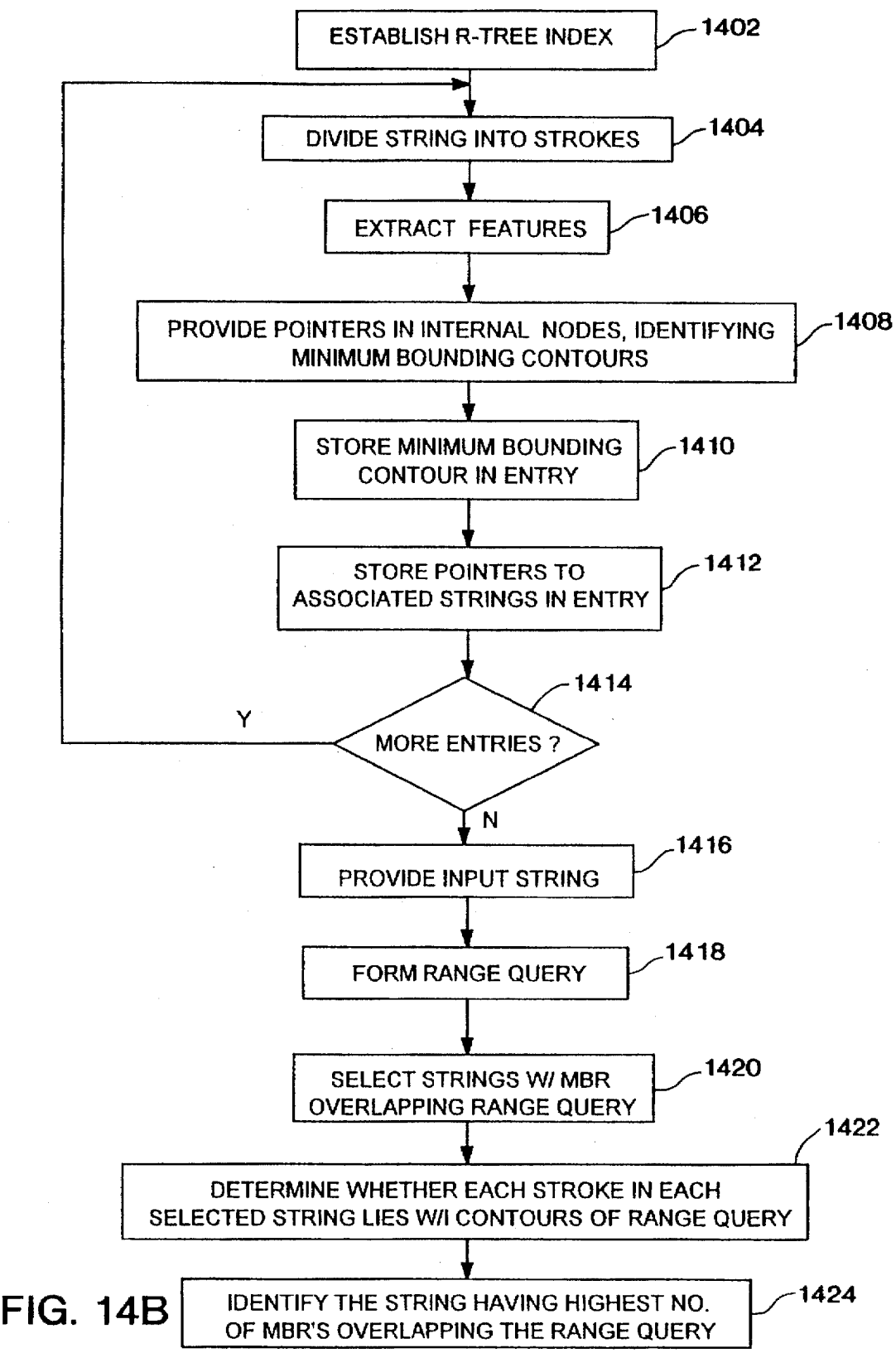
FIG. 14B is a flow chart diagram of a method of inserting strings in the index of FIG. 14A and searching the index.

FIGS. 14A and 14B show another way to reduce the index size. This method reduces the index size by avoiding explicit storage of the points corresponding to the different strokes in the index. Instead, groups of S strokes (=points) that are close to each other in the multi-dimensional space may be formed, and each group may be represented by a respective minimum bounding rectangle (MBR) that encloses all of the storkes in the group. In this case, each leaf node (e.g., 1460) of the R-Tree index 1450 contains a set of entries, each having a pointer to an MBR (entry 1460*a* points to MBR1, entry 1460*b* points to MBR2, and entry 1460*c* points to MBR3). Each MBR points to the set of strings that have at least one stroke enclosed by this MBR. For example, using the database objects shown in FIG. 14A, leaf 1460 has MBR's MBR1, MBR2 and MBR3. MBR2 includes pointers to a set SET of strings STR1, STR2, ..., STR5. Each of the strings STR1, STR2, ..., STR5 has a stroke within MBR2.

FIG. 14B is a flow chart diagram showing the method of using the R-Tree Index 1450. At step 1402, the index is established. Steps 1404–1414 are executed to insert a string into the database. (Steps 1404–1414 may be repeated for each string inserted). At step 1404, a string is divided into strokes, and at step 1406, features are extracted. At step 1408 pointers are provided in the internal nodes 1452, 1454, 1456 and 1458, identifying the minimum bounding contours (MBR's) in which the strokes to be inserted lie. At 1410, in one of the leaf nodes (e.g., node 1460), a pointer to an MBR is stored in an entry (e.g., MBR1 in entry 1460*a*, MBR2 in entry 1460*b* or MBR3 in entry 1460*c*), the MBR having a pointer to the string that is being inserted. At step 1412, a pointers to a corresponding set of strings are stored in the entry (e.g., MBR2 has pointers to strings STR1–STR5).

At step 1416, the input string is provided. At step 1418, a range query is formed for each stroke in the input string. At step 1420, each string associated with an MBR that overlaps the range query is selected, to form a candidate set. At step 1422, a distance computation may be performed for each stroke in the candidate set to eliminate any stroke that is inside an MBR overlapping the query range, but is located outside of the query range itself (as explained below). At step 1424, a voting algorithm is applied to determine the string that has the highest number of MBR's which overlap the range query.

In using the method of FIG. 14B, precision is reduced in exchange for space efficiency. As described above, each stroke in the query string initiates a range query that is centered at the point that represents the stroke. The range queries are formed in the same manner as described above. Each range query has a lower limit and an upper limit for each feature (axis) of the feature space, defining a hyper-rectangle. However, instead of looking for the strokes in the database that lie with the contour of a range query, this variation involves looking for the MBR's in the database that overlap, or are completely enclosed within, the range query. A range query returns any MBR's that intersect with the query rectangle. All the points (strokes) that are enclosed in the overlapping MBR are reported and submitted to the voting algorithm.

Referring again to FIGS. 12B, it is apparent that searching for MBR's which overlap the range query may yield similar results to the method of searching for strokes which lie within the range query. In FIG. 12B, the results are the same.

Of course, in other cases, there may be some points enclosed in the MBR which fall outside the query rectangle (These are false hits). However, once the candidate set is formed, the distance function for each member of the candidate set may be computed to eliminate false hits. Also, the candidate set may be reduced further using a procedure such as the tandem matching technique described above. Steps 716–726, described above with reference to the tandem matching method of FIG. 7, may be performed to eliminate false hits in the candidate set provided by querying the R-Tree index 800.

There is an obvious trade-off between the size of the candidate set and the number of strokes grouped in a single MBR. The candidate set size increases with increasing the number of strokes in an MBR. Also, increasing the number of strokes grouped in a single MBR may adversely affect the accuracy of the final answer. The optimal the number of strokes grouped in a single MBR for a given database may be determined experimentally.

REDUCING THE CANDIDATE SET SIZE FOR THE R-TREE

A string S is similar to the query string Q only if the following two requirements are met:

1. S contains a set of strokes that are similar to the set of strokes in Q; and
2. these strokes appear in the same order in both strings.

The querying techniques described above for the R-Tree index considers the combination of strokes in each string of the database without regard to their sequence. The output of the search query using the R-Tree index 800 is a set of strings which have stroked similar to the query stroke, but which do not necessarily occur in the same location. The candidate set is thus large because it contains many false candidates (incorrect permutations of the strokes). Moreover, the voting algorithm does not take into consideration the location of the stroke.

To use the stroke location, and to reduce the size of the candidate set, the location of the stroke may be stored inside the string as an additional dimension in the feature space. Each stroke is then represented by k features, $f_1, f_2, \ldots, f_k$ and by its location $stk_{loc}$ inside the string in a (k+1)-dimensional space.

Two instances of the same string do not, in general, have equal numbers of strokes. The difference, however, is expected to be small. Thus, the answer to the range query that corresponds to stroke $q_i$ should include strings that have similar strokes, not only in the position i, but also in a window of length w around i. The inventors have determined experimentally that w=3 gives good results (thus covering stroke numbers i−1, i, and i+1).

In substring matching, however, any method chosen should allow the query string to start at any position inside the database string. In this case, a partial match query rather than a range is used. In a partial match query, the extent of the query rectangle is specified for all axes $f_1, f_2, \ldots, f_k$ as described above. For the stroke location $stk_{loc}$ axis, the extent of the query rectangle is left open (−∞ to +∞) to allow the query string to start at any position inside the database string. Otherwise, the algorithm is similar to that for the full string similarity query.

EXPERIMENTAL CONFIGURATION FOR THE R-TREE INDEX

An experimental configuration for the R-Tree index was developed. The code was implemented in the "C" language, to run under UNIX on a SPARC workstation. The database included 205 handwritten cursive words produced by one writer. The same writer then wrote words to be used as search strings. Two sets of experiments were performed, one using 11 of the 13 stroke features described above, and another using only six of the 13 stroke features. In all the experiments, the stroke location was stored as an additional feature. Each stroke was stored as a separate point. Because the data used in the experiments were static, a Hilbert-packed R-trees was used as an underlying multi-dimensional index. The node size was fixed at one K-Byte.

The segmentation algorithm in the exemplary configuration ends the stroke when it encounters a local minimum. Some of the resulting strokes are tiny and do not contribute to the final image of the string. A few of these tiny strokes may be produced simply by pressing or raising the pen. These strokes not only increase the size of the database but may also adversely affect the retrieval performance. Accordingly, such strokes were filtered out from both the database and the query strings. Only strokes having an MBR diagonal larger than 15 points were included.

The experiments measured the number of correct answers that were ranked first (received the highest score), second, or third by the voting algorithm. One skilled in the art would understand that the greater the number of answers in the candidate set reported, the more likely it is that the correct answer will be within the reported subset.

In the second set of experiments the Karhunen-Loeve transform was applied to a sample of words to calculate the transformation matrix. Then all the words in the database were mapped—where the point is the unit distance in the tablet device—to the new six-dimensional space. The queries were also mapped using the same transformation matrix before searching the tree. As expected, the matching rate decreased as a smaller number of dimensions were used. Although the space required to store a stroke using 6 features is reduced by nearly half compared to the use of 11 features, most of the matching power of the index that uses 11 features was retained (Less than a 10% decrease in matching power was observed).

VARIATIONS OF THE R-TREE INDEX

Other variations of the R-tree may also be used in accordance with the invention. For example, the packed and Hilbert-packed R-trees may be used for static databases. For data of a dynamic nature (where data may be inserted or deleted at any time), the Hilbert R-tree, the R*-tree the R+-tree and the Hilbert R-tree may be used. The Hilbert R-tree may increase space utilization to any desired value by employing the concept of deferred splitting (local rotation).

The following documents are expressly incorporated by reference for their teachings on variations of the R-tree: N. Roussopoulos et al., *Direct Spatial Search on Pictorial Databases using Packed R-Trees*, Proceedings of ACM SIGMOD, pp 17–31, Austin, Tex., May, 1985; I. Kamel et al., *On Packing R-Trees*, Proceedings of 2nd International Conference on Information and Knowledge Management (CIKM-93), pp 490–499, Arlington, Va., November, 1993; T.Sellis et al., *The R+ Tree: a Dynamic Index for Multi-Dimensional Objects*, Proceedings of VLDB Conf., pp507–518, Brighton, England, September 1987; N. Beckmann, et al., *The R\*-Tree: an Efficient and Robust Access Method for Points and Rectangle*, Proceedings of ACM SIGMOD, pp322–331, Atlantic City, N.J., May 1990; and Kamel et al., *Hilbert R-Tree: an Improved R-Tree using Fractals*, 205h International Conference on Very Large Databases (VLDB '94), pp 500–509, Santiago, Chile, September 1994.

The R-tree is used in the exemplary embodiment because of its ability to prune the search space at early levels of the tree structure and because of the guarantee of good space utilization. Although the exemplary embodiment uses an R-tree, any multi-dimensional index, e.g., Quadtrees, which are described in I. Gargantini, *An Effective Way to Represent Quadtrees*", Comm of ACM, 25(12): pp 905–910, December 1982, and H. Samet, *The Design and Analysis of Spatial Data Structures*, Addison-Wesley, Reading, Mass., 1990, both of which are expressly incorporated by reference herein for their teachings on Quadtrees.

Gridfiles may also be used. Gridfiles are described in J. Nievergelt, et al., *The Grid File: an adaptable, Symmetric Multikey File Structure*, ACM TODS, 9(1): pp 38–71 which is expressly incorporated by reference herein for its teachings on the Gridfile index.

AN R-TREE INDEX USING GLOBAL FEATURES

According to another aspect of the invention (shown in FIG. 19), an R-Tree index may be formed using only word-level features, as opposed to the stroke-level features used in the embodiments of FIGS. 10 and 14B. According to this aspect of the invention, a set of global features that work well for cursive handwriting applications are identified. As an advantage, the word-level based index requires much less space than the stroke-level index. On the other hand, the cardinality of the answer size of the word-level index is larger than that of stroke-level index. The new index may be used as a coarse filter to prune the search space. Then a more costly sequential method (e.g., tandem matching) may be used to refine the results.

Global features are used to characterize the different words. A set of features $f_1, f_2, \ldots, f_x$ are calculated for each word in the database as well as for the queries. Thus, each word may be represented as a multidimensional point in x-dimensional space. A good feature maps two instances of the same word to points that are close in the multidimensional space. At the same time, a good feature maps two different words as far apart as possible.

Figure 19:
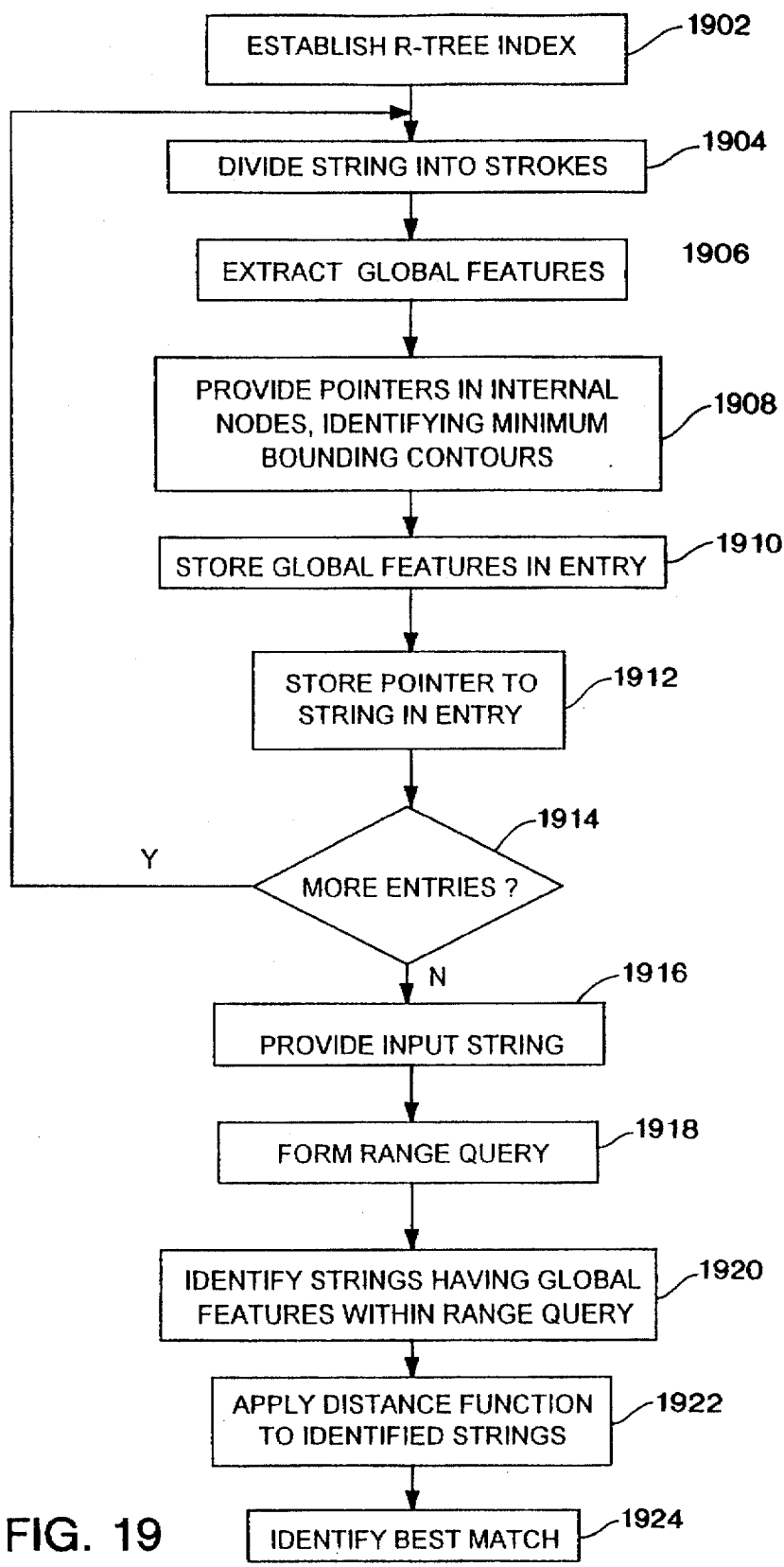
FIG. 19 is a flow chart diagram of a further exemplary method for indexing the strings in the database using global features and an R-Tree index, and for querying the database.

FIG. 19 is a flow chart diagram summarizing the steps of this variation of the exemplary method. At step 1902, the R-Tree index is established. Steps 1904–1914 may be repeated for each string inserted in the database. At step 1904, the string is divided into strokes. At step 1906, the global features are extracted from each string. At step 1908, pointers are added to the internal nodes, identifying the MBC's in which the string to be inserted lies. At step 1910, the global features of the string to be inserted are stored in the entry for this string. At step 1912, a pointer to the string is stored in the entry.

At step 1916, the index is queried by providing an input string. At step 1918, a range query is formed for each of the global features in the input string. At step 1920, the strings in the database having global feature values within the ranges of the respective range queries are identified, to form a candidate set. At step 1922, the candidate set is processed further by, for example, applying the above described voting step, or by applying a distance function, to rank the identified strings in order of their proximity to the input string. At step 1924, the string which has the best match is determined.

Extracting good global features is not an easy task. For a feature to be good it should assign different instances of the same word close-by values in the feature domain. Features may also be correlated and dependent. Adding a new feature may mean no improvement in the performance if the feature is redundant (covered by other features in use). Using a large number of features not only increases the database size but also adversely affects the search performance. This is known as the "dimensionality Curse"0 problem. Thirteen global features are described above, in the section entitled "Global Features."

The output of the similarity search is the candidate set, which contains a set of words that are most similar to the query string. A function $f_n$ is used to measure the similarity between two words $W_{db}$, Q. The query string is then compared with every string in the candidate set using $f_n$ to find the most similar answer.

$$f_n(wdb,Q) = Lev(wdb,Q) \cdot fac(wdb,Q) \qquad (18)$$

where Lev(wdb,Q) is the Levenshtein distance and $fac$(wdb,Q) denotes a factor that is computed by the following formula $$fac(wdb,Q) = \prod_{i=1,\ldots,x} \frac{|f_i^w - f_i^Q|}{\max_i}$$

That is, $fac$ is the product of factors obtained by dividing the absolute difference of values between selected features of the word and query by the maximum difference possible ($\max_i$).

It is enough to use a subset of the 13 global features described above to compute fac. The inventors have determined that the aggregate distance metric $df_1, f_2, f_3, f_4$ referred to above (in the section entitled "Global Features") provides good results. Other combinations of global features may also be used. These combinations may include other subsets of the 13 global features described above, or other global features having similar discriminating capability. One of ordinary skill in the art can readily determine other combinations of global features that may be useful in the R-Tree index.

Although the invention has been described in terms of exemplary embodiments, it is not limited thereto. Rather, the appended claims should be construed to include other variants and embodiments of the invention which may be made by those skilled in the art without departing from the true spirit and scope of the present invention.

What is claimed:

1. In a database having a plurality of handwritten strings, apparatus for determining a distance between two of the plurality of strings, comprising:

(a) a processor for extracting a plurality of global features from each one of the plurality of handwritten strings in the database, comprising:

(1) means for dividing the handwritten string into a plurality of strokes;

(2) means for identifying a plurality of bounding boxes, each bounding box containing a respectively different one of the plurality of strokes;

(3) means for extracting from the string:

(A) a number of points in the string, (B) a maximum angle between a first one of the points in the string and a corner of a tallest one of the plurality of bounding boxes, (C) a number of positive inversions in the string, and (D) a number of negative inversions in the string;

(b) means for storing the extracted global features in a storage medium; and (c) means for calculating the distance between the two handwritten strings based on all of the numbers of points, maximum angles, numbers of positive inversions and numbers of negative inversions extracted by the extracting means.

2. Apparatus according to claim 1, wherein the calculating means include:
   (1) means for computing a Levenshtein distance between the two handwritten strings, and
   (2) means for multiplying the Levenshtein distance by an adjustment factor that is based on all of the extracted global features to form the distance between the two handwritten strings.

3. Apparatus according to claim 2, wherein the multiplying means include:
   (A) means for calculating four values by which the two handwritten strings differ from one another in number of points, maximum angle, number of positive inversions and number of negative inversions, respectively,
   (B) means for normalizing the four calculated values, based on all of the numbers of points, maximum angles, numbers of positive inversions and numbers of negative inversions extracted by the extracting means, to form four factors, and
   (C) means for multiplying the four factors together to form the adjustment factor.

4. Apparatus according to claim 1, wherein the calculating means include:
   means for identifying a maximum number of points among the number of points of each one of the plurality of handwritten strings,
   means for identifying a minimum number of points among the number of points of each one of the plurality of handwritten strings,
   means for subtracting the minimum number of points from the maximum number of points to form a first point difference value,
   means for subtracting the number of points in a first one of the two handwritten strings from the number of points in a second one of the two handwritten strings to form a second point difference value, and
   means for dividing the second point difference value by the first point difference value to form a point factor that is used to calculate the distance.

5. Apparatus according to claim 1, wherein the calculating means include:
   means for identifying a maximum value of the maximum angle among the maximum angles of each one of the plurality of handwritten strings,
   means for identifying a minimum value of the maximum angle among the maximum angles of each one of the plurality of handwritten strings,
   means for subtracting the minimum value of the maximum angle from the maximum value of the maximum angle to form a first angle difference value,
   means for subtracting the maximum angle in a first one of the two handwritten strings from the maximum angle in a second one of the two handwritten strings to form a second angle difference value, and
   means for dividing the second angle difference value by the first angle difference value to form an angle factor that is used to calculate the distance.

6. Apparatus according to claim 1, wherein the calculating means include:
   means for identifying a maximum number of positive inversions among the numbers of positive inversions of each one of the plurality of handwritten strings,
   means for identifying a minimum number of positive inversions among the numbers of positive inversions of each one of the plurality of handwritten strings,
   means for subtracting the minimum number of positive inversions from the maximum number of positive inversions to form a first positive inversion difference value,
   means for subtracting the number of positive inversions in a first one of the two handwritten strings from the number of positive inversions in a second one of the two handwritten strings to form a second positive inversion difference value, and
   means for dividing the second positive inversion difference value by the first positive inversion difference value to form a positive inversion factor that is used to calculate the distance.

7. Apparatus according to claim 1, wherein the calculating means include:
   means for identifying a maximum number of negative inversions among the numbers of negative inversions of each one of the plurality of handwritten strings,
   means for identifying a minimum number of negative inversions among the numbers of negative inversions of each one of the plurality of handwritten strings,
   means for subtracting the minimum number of negative inversions from the maximum number of negative inversions to form a first negative inversion difference value,
   means for subtracting the number of negative inversions in a first one of the two handwritten strings from the number of negative inversions in a second one of the two handwritten strings to form a second negative inversion difference value, and
   means for dividing the second negative inversion difference value by the first negative inversion difference value to form a negative inversion factor that is used to calculate the distance.

8. A method for indexing and querying a database having a plurality of electronic handwritten strings, comprising the steps of:
   (a) extracting a plurality of global features from each one of the plurality of electronic handwritten strings;
   (b) forming a fixed query tree index having a plurality of leaves and a plurality of internal nodes which belong to a plurality of levels, including the steps of:
      (1) associating a respectively different single key with each one of the plurality of levels, each key being a handwritten string,
      (2) associating each string with one of the plurality of leaves, such that:
         (A) each child of each internal node in any one of the plurality of levels between the one leaf and a root node of the index is a root of a respective subtree, and
         (B) each string associated with any leaf in the subtree which includes the one leaf is equally distant from the single key associated with the one level, using a distance function based on the global features; and
   (c) querying the fixed query tree to search for a first subset of the strings, such that each string in the first subset is within a threshold distance of an input string, according to the distance function used in step (b) (2) (B).

9. A method according to claim 8, further comprising the steps of:

(d) applying a plurality of matching criteria to the strings in the first subset to identify one or more strings in the first subset that most closely match the input string.

10. A method according to claim 9, wherein step (d) comprises:
    (1) determining a respective global distance between the input string and each of the strings in the first subset, individually, and
    (2) forming a second subset of the plurality of strings, the second subset including each of the strings in the first subset for which the global distance is less than a threshold value.

11. A method according to claim 10, wherein step (1) includes, for each one of the input string and the plurality of strings, the steps of:
    (A) dividing the one string into a plurality of strokes,
    (B) constructing a respective minimum bounding rectangle which completely encloses each one of the strokes, individually,
    (C) selecting a tallest one of the minimum bounding rectangles,
    (D) calculating an angle alpha for the one string, according to the following equation:

$$\text{alpha} = \arctan \frac{h_m}{x_m - x_0 + w_m}$$

where $x_0$ is a location of a corner of a first one of the minimum bounding rectangles, $h_m$ is a height of the tallest minimum bounding rectangle, $x_m$ is a location of a corner of the tallest minimum bounding rectangle, and $w_m$ is a width of the tallest minimum bounding rectangle, and step (2) includes determining the global distance between the input string and each one of the plurality of strings, individually, based on a difference between the angle alpha of the one string and the angle alpha of the input string.

12. A method according to claim 10, wherein step (d) further comprises:
    (3) determining a respective first edit distance between the input string and each of the strings in the second subset, individually, and
    (4) forming a third subset of the plurality of strings, the third subset including each of the strings in the second subset for which the first edit distance is less than a second threshold value.

13. A method according to claim 12, wherein the first edit distance is determined by a number of insertion and/or deletion operations which transform one of the second subset of the plurality of strings into the input string, and step (d) further comprises:
    (5) determining a respective second edit distance between the input string and each of the strings in the third subset, individually, said second edit distance being determined by a number of insertion, deletion, substitution, split and/or merge operations which transform one of the third subset of the plurality of strings into the input string, and
    (6) forming a fourth subset of the plurality of strings, the fourth subset including each of the strings in the third subset for which the second edit distance is less than a third threshold value, wherein the strings in the fourth subset are identified as being closest to the input string.

14. A method for indexing a database having a plurality of electronic handwritten strings, comprising the steps of:

(a) performing, for each one of the plurality of electronic handwritten strings, the steps of:
    (1) dividing the handwritten string into a plurality of strokes;
    (2) identifying a plurality of bounding boxes, each bounding box containing a respectively different one of the plurality of strokes;
    (3) extracting a plurality of global features from the string, the plurality of global features including:
        (A) a number of points in the string,
        (B) a maximum angle between a first one of the points in the string and a corner of a tallest one of the plurality of bounding boxes,
        (C) a number of positive inversions in the string, and
        (D) a number of negative inversions in the string;
(b) forming a fixed query tree index having a plurality of leaves and a plurality of internal nodes which belong to a plurality of levels, including the steps of:
    (1) associating a respectively different key with each one of the plurality of levels, each key being a handwritten string,
    (2) calculating a respective distance between one of the plurality of strings and one or more of the keys, based on all of the numbers of points, maximum angles, numbers of positive inversions and numbers of negative inversions extracted in step (a) (3),
    (3) associating the one string with one of the plurality of leaves, such that:
        (A) each child of each internal node in any one of the plurality of levels between the one leaf and a root node of the index is a root of a respective subtree, and
        (B) each string associated with any leaf in the subtree which includes the one leaf is equally distant from the key associated with the one level, using the distances calculated in step (b) (2); and
    (4) repeating steps (b) (2) and (b) (3) each time a respectively different one of the plurality of electronic handwritten strings is added to the database.

15. A method according to claim 14, wherein step (b) (2) includes:
    (A) computing a Levenshtein distance between the one handwritten string and the one key, and
    (B) multiplying the Levenshtein distance by an adjustment factor that is based on all of the global features extracted in step (a) (3), to form the distance between the one handwritten string and the one key.

16. A method according to claim 15, wherein step (b) (2) (B) includes:
    (i) calculating four values by which the one handwritten string differ from the key in number of points, maximum angle, number of positive inversions and number of negative inversions, respectively,
    (ii) normalizing the four values calculated in step (b) (2) (B) (i), based on all of the numbers of points, maximum angles, numbers of positive inversions and numbers of negative inversions extracted in step (a), to form four factors, and
    (iii) multiplying the four factors together to form the adjustment factor.

17. A method according to claim 14, wherein step (b) (3) includes:
    (i) selecting the root node of the index,
    (ii) identifying the key associated with the selected node,
    (iii) computing a distance between the one handwritten string and the identified key, (iv) selecting the one of the children of the selected node which is the root of a subtree, in which subtree each leaf is associated with a respective one of the plurality of strings that is equal to the one handwritten string in distance from the identified key, (v) repeating steps (b) (3) (ii) through (b) (3) (iv) until a leaf is selected, and (vi) associating the one handwritten string with the selected leaf, if a number of handwritten strings associated with the selected leaf is less than a predetermined bucket size.

18. A method according to claim 17, wherein step (b) (3) further includes:

(vi) performing the following steps (I) through (II) if the number of handwritten strings associated with the selected leaf equals the bucket size:

(I) replacing the selected leaf with a new internal node, (II) establishing at least two new leaves as children of the new internal node, (III) associating the one handwritten string and each of the plurality of handwritten strings associated with the selected leaf with respective ones of the new leaves.

19. A method according to claim 18, wherein step (b) (3) (vi) further includes:

(IV) associating a new key with a level of the new internal node when step (b) (3) (vi) (I) is executed, if the new internal node is the first internal node in the level of the new internal node.

20. A method according to claim 14, wherein step (b) (2) includes using a measure of distance in accordance with the following inequality:

$$d(K,S2) \leq d(K,S1) + d(S1,S2)$$

where K is a key, S1 is a first string, S2 is a second string, d(K,S1) is a distance between the key and the first string, d(S1,S2) is a distance between the first string and the second string, and d(K,S2) is a distance between the key and the second string.

21. A method according to claim 20, further comprising the steps of:

(c) providing an input string and a desired maximum distance, D;

(d) selecting the root node of the index;

(e) identifying the key associated with the level of the selected node;

(f) computing a distance, $d_i$, between the input string and the identified key;

(g) selecting each child of the selected node that is a root of a subtree which complies with the following inequality:

$$d_i - D \leq d \leq d_i + D,$$

wherein d is the distance between any of the leaves of the subtree and the identified key;

(h) repeating steps (e) through (g), recursively, for each selected node that is an internal node.

22. A method for indexing a database having a plurality of electronic handwritten strings, comprising the steps of:

(a) performing, for each one of the plurality of electronic handwritten strings, the steps of:

(1) dividing the handwritten string into a plurality of strokes;

(2) extracting a plurality of features from each stroke of the string;

(b) forming an R-tree index having a plurality of leaves and a plurality of internal nodes, each one of the plurality of internal nodes having at least one child node, including the steps of:

(1) providing, for each respective one of the child nodes, a pointer to the child node and an identification of a minimum bounding contour associated with the child node, the minimum bounding contour containing a plurality of further minimum bounding contours pointed to by respective ones of a corresponding plurality of entries in the child, if the child node is an internal node, each minimum bounding contour defining a respective range of values within which the value of one of the features of one of the plurality of strokes lies;

(2) storing a plurality of entries in each leaf node, each entry comprising:

(A) a feature vector representing a respective one of the plurality of strokes, and (B) a pointer which points to the one of the plurality of electronic handwritten strings containing the one stroke, the one electronic handwritten string being a member of the subset, wherein all the feature vectors stored in any one leaf node differ from one another by less than a threshold distance.

23. A method according to claim 22, further comprising the steps of:

(c) providing an input string which comprises a plurality of input strokes;

(d) forming a range query defined by a plurality of contours, each of the plurality of contours defining a range of values containing a respective one of the input strokes;

(e) identifying one of the plurality of electronic handwritten strings as being found by the range query, such that the one string includes a highest number of strokes for which the respective feature vectors fall within any of the plurality of contours of the range query.

24. A method for indexing a database having a plurality of electronic handwritten strings, comprising the steps of:

(a) performing, for each one of the plurality of electronic handwritten strings, the steps of:

(1) dividing the handwritten string into a plurality of strokes;

(2) extracting a plurality of features from each stroke of the string;

(b) forming an R-tree index having a plurality of leaves and a plurality of internal nodes, each one of the plurality of internal node having at least one child node, including the steps of:

(1) providing, for each respective one of the child nodes, a pointer to the child node and an identification of a minimum bounding contour associated with the child node, the minimum bounding contour containing a plurality of further minimum bounding contours pointed to by respective ones of a corresponding plurality of entries in the child node, if the child node is an internal node, (2) storing a plurality of entries in each leaf node, (A) each entry comprising an additional minimum bounding contour which is associated with a respective range of values for each one of the plurality of features, (B) the additional minimum bounding contour being associated with a plurality of pointers, each pointer pointing to a respective one of the plurality of electronic handwritten strings for which the features of at least one stroke thereof are within the respective range of values of the additional minimum bounding contour, (C) wherein all the additional minimum bounding contours stored in any one leaf node differ from one another by less than a threshold distance.

25. A method according to claim 24, further comprising the steps of:

(c) providing an input string which comprises a plurality of input strokes;

(d) forming a range query defined by a plurality of contours, each of the plurality of contours defining a range of values containing a respective one of the strokes in the input string;

(e) identifying one of the plurality of electronic handwritten strings as being found by the range query, such that the identified string has a highest number of additional minimum bounding contours which overlap any of the plurality of contours of the range query.

26. A method according to claim 25, wherein step (e) includes:

selecting each of the plurality of electronic handwritten strings which have at least one additional minimum bounding contour overlapping at least one of the plurality of contours of the range query, determining whether each one of the strokes in each selected string lies within any of the plurality of contours of the range query, identifying the string that has the highest number of additional minimum bounding contours which overlap any of the plurality of contours of the range query, based only on those strokes which lie within the plurality of contours of the range query.

27. A method for indexing a database having a plurality of electronic handwritten strings, comprising the steps of:

(a) performing, for each one of the plurality of electronic handwritten strings, the steps of:

(1) dividing the handwritten string into a plurality of strokes;

(2) identifying a plurality of bounding boxes, each bounding box containing a respectively different one of the plurality of strokes;

(3) extracting a plurality of global features from the string, the plurality of global features including:

(A) a number of points in the string, (B) a maximum angle between a first one of the points in the string and a corner of a tallest one of the plurality of bounding boxes, (C) a number of positive inversions in the string, and (D) a number of negative inversions in the string;

(b) forming an R-tree index having a plurality of leaves and a plurality of internal nodes, (1) each internal node having at least one child node, and having, for each respective child node, a pointer to the child node and an identification of a minimum bounding contour associated with the child node, the minimum bounding contour containing a plurality of further minimum bounding contours pointed to by respective ones of a plurality of entries in the child node, if the child node is an internal node, (2) each one of the leaf nodes having a plurality of pointers, each pointer of a given one of the leaf nodes pointing to a respective one of a subset of the plurality of handwritten strings, for which subset the global features extracted in step (a) (3) differ from one another by less than a threshold value.

28. A method according to claim 27, wherein step (b) includes storing a plurality of entries in each leaf node, each entry comprising:

a global feature vector, and one of the plurality of pointers, the one pointer pointing to one of the plurality of electronic handwritten strings to which the global feature vector belongs.

29. A method according to claim 28, further comprising the steps of:

(c) providing an input string which has a set of input global feature values;

(d) forming a range query comprising ranges of values containing the input global feature values; and (e) identifying each string having global features which lie within the ranges of the range query.

30. A method according to claim 29, further comprising the steps of:

(f) computing a respective distance value between each one of the identified strings and the input string; and (g) determining which of the identified strings most closely matches the input string based on the distance function.

* * * * *

UNITED STATES PATENT AND TRADEMARK OFFICE
CERTIFICATE OF CORRECTION

PATENT NO. : 5,710,916
DATED : January 20, 1998
INVENTOR(S) : Barbará et al.

It is certified that error appears in the above-identified patent and that said Letters Patent is hereby corrected as shown below:

On the Cover Page

[19] under United States Patent "Barbaráet al" should read -- Barbará et al.--

[57] ABSTRACT line 6, the word "suing" should read --string--

[56] References Cited

R. Baeza-Yates et al., "Proximity Matching Using Fixed-Queries Trees", 5th Combinatorial Pattern Matching, LNCS 807, pp. 198-212, June 1994.

Dean Rubine, "Specifying Gestures by Example", Computer Graphics, Vol. 25, No. 4, pp. 329-337, July 1991.

On Page 2, under OTHER PUBLICATIONS
Delete the 2nd occurrence of the following references as they appear twice in the Letters Patent --Dimitriadis et al., Paruseau et al. and Emami et al.--

Signed and Sealed this

Twenty-first Day of September, 1999

Attest:

Q. TODD DICKINSON

*Attesting Officer*     *Acting Commissioner of Patents and Trademarks*